(12) United States Patent
Brady et al.

(10) Patent No.: US 7,092,101 B2
(45) Date of Patent: Aug. 15, 2006

(54) METHODS AND SYSTEMS FOR STATIC MULTIMODE MULTIPLEX SPECTROSCOPY

(75) Inventors: David J. Brady, Durham, NC (US); Michael E. Sullivar, Raleigh, NC (US)

(73) Assignee: Duke University, Durham, NC (US)

(*) Notice: Subject to any disclaimer, the term of this patent is extended or adjusted under 35 U.S.C. 154(b) by 180 days.

(21) Appl. No.: 10/417,066

(22) Filed: Apr. 16, 2003

(65) Prior Publication Data
US 2004/0207855 A1 Oct. 21, 2004

(51) Int. Cl.
G01B 9/02 (2006.01)
(52) U.S. Cl. .................. 356/456; 356/419
(58) Field of Classification Search ........... 356/416, 356/419, 451, 454, 455, 456, 457, 460; 250/339.08, 250/339.09
See application file for complete search history.

(56) References Cited

U.S. PATENT DOCUMENTS

| | | | |
|---|---|---|---|
| 4,054,389 A | 10/1977 | Owen | |
| 4,449,823 A * | 5/1984 | Schwiesow | 356/451 |
| 5,059,027 A | 10/1991 | Roesler et al. | |
| 5,166,755 A | 11/1992 | Gat | |
| 5,245,404 A | 9/1993 | Jannson et al. | |
| 5,321,265 A | 6/1994 | Block | |
| 5,421,337 A * | 6/1995 | Richards-Kortum et al. | 600/477 |
| 5,424,545 A | 6/1995 | Block et al. | |
| 5,434,412 A | 7/1995 | Sodickson et al. | |
| 5,440,388 A * | 8/1995 | Erickson | 356/456 |
| 5,604,594 A | 2/1997 | Juffinger | |
| 5,660,181 A * | 8/1997 | Ho et al. | 600/408 |
| 5,672,875 A | 9/1997 | Block et al. | |
| 5,777,736 A * | 7/1998 | Horton | 356/456 |
| 5,872,655 A | 2/1999 | Seddon et al. | |
| 5,943,122 A * | 8/1999 | Holmes | 356/73 |
| 6,002,480 A | 12/1999 | Izatt et al. | |
| 6,002,953 A | 12/1999 | Block | |
| 6,031,619 A * | 2/2000 | Wilkens et al. | 356/419 |
| 6,057,925 A | 5/2000 | Anthon | |
| 6,093,246 A * | 7/2000 | Lin et al. | 1/1 |
| 6,110,522 A * | 8/2000 | Lepper et al. | 427/2.11 |
| 6,115,121 A | 9/2000 | Erskine | |
| 6,329,668 B1 * | 12/2001 | Razeghi | 257/14 |
| 6,351,307 B1 | 2/2002 | Erskine | |
| 6,449,041 B1 | 9/2002 | Jung et al. | |
| 6,476,409 B1 * | 11/2002 | Iwasaki et al. | 257/13 |
| 2003/0031434 A1 * | 2/2003 | Fajardo et al. | 385/115 |

OTHER PUBLICATIONS

"MicroPac(TM) Compact Spectrometer," Optical Coating Laboratory, Inc. (Santa Rosa, USA), p. 1-6 (2001).
Douglas A. Skoog, "Principles of Instrumental Analysis," 3rd ed., CBS College Publishing (Philadelphia, USA), p. 146-157 and 332-339, (1985).
PCT International Search Report.

* cited by examiner

*Primary Examiner*—Samuel A. Turner
(74) *Attorney, Agent, or Firm*—Pillsbury Winthrop Shaw Pittman LLP

(57) ABSTRACT

Methods and systems for static multimode multiplex spectroscopy are disclosed. According to a method for static multimode multiplex spectroscopy, spectral energy emanating from different points of a diffuse source is simultaneously received. Different multi-peak filter functions are applied to the spectral energy emanating from the different points to produce a multi-channel spectral measurement for each point. The multi-channel spectral measurements are combined to estimate a property of the diffuse source.

17 Claims, 17 Drawing Sheets

METHODS AND SYSTEMS FOR STATIC MULTIMODE MULTIPLEX SPECTROSCOPY

GOVERNMENT INTEREST

This invention was made with Government support under Contract No. N01-AA-23103 awarded by NIH. The Government has certain rights in the invention.

TECHNICAL FIELD

The present invention relates to methods and systems for static multimode multiplex spectroscopy. More particularly, the present invention relates to methods and systems for static multimode multiplex spectroscopy using different multi-peak filter functions to filter spectral energy emanating from different points of a diffuse source and for combining the multi-peak measurements to estimate a property of the source.

BACKGROUND ART

Optical spectroscopy may be used to detect and quantify characteristics of a source, such as the average spectrum of the source or the density of chemical and biological species of the source. As used herein, the term "source" refers to the object being spectrally analyzed. In determining chemical composition of a source, the spectral signature of the target species may be encoded on the optical field by mechanisms including absorption, admission, inelastic scattering, fluorescence, and wave mixing. Many sources are referred to as large etendue because they reflect or scatter light in a large solid angle over a large area. The etendue of a source is a measure of both the spatial extent of the source and the solid angle in to which it radiates. Large etendue sources are also referred to as incoherent or diffuse sources because low spatial coherence is implicit in a large solid angle radiated over a large area. An example of a large etendue source is laser-illuminated biological tissue.

One problem with measuring light radiated from large etendue sources using conventional spectrometers is that conventional spectrometers use filters that decrease optical throughput. For example, a conventional multiplex spectrometer measures light emanating from a source using elemental detectors with a narrowband color filter placed over each detector. Using narrowband color filters over each detector reduces the optical throughput of the conventional spectrometer. As a result, conventional multiplex spectrometers that utilize narrowband filters are incapable of accurately determining the optical properties of diffuse sources.

In another type of conventional spectrometer, multimodal measurements are taken in series and the measurements are combined to estimate the optical properties of a diffuse source. The spectrometers that perform such measurements are referred to as scanning spectrometers. Using scanning spectrometers to measure diffuse sources is disadvantages because such detectors require microelectromechanical and/or piezoelectric components in order to successively apply different spectral filters to the detectors, and such components are expensive and difficult to fabricate.

A further disadvantage of scanning spectrometers is that taking multiple measurements in series increases measurement time. Increasing measurement time may be undesirable for some types of measurements, such as in vivo tissue measurements.

Yet another disadvantage of scanning spectrometers is lack of intelligent spectral filters. Conventional scanning spectrometers typically capture the full spectrum of electromagnetic radiation. Capturing the full spectrum is inefficient because some measurements contain radiation bands that are not of interest to analyzing a particular source.

Accordingly, in light of the difficulties associated with conventional spectroscopy, there exists a need for improved methods and systems for multimode multiplex spectroscopy capable of accurately and efficiently measuring characteristics of large etendue sources.

DISCLOSURE OF THE INVENTION

The present invention includes methods and systems for static multimode multiplex spectroscopy. According to one aspect of the invention, a method for static multimode multiplex spectroscopy includes receiving spectral energy emanating from a plurality of different points of a diffuse source and simultaneously applying different multi-peak filter functions to the spectral energy emanating from the different points to produce a multichannel spectral measurement for each point. The multichannel spectral measurements for the different points are combined to estimate a property, such as the average spectrum or the chemical composition, of the diffuse source.

One capability of the invention is capturing spectral signatures from sources that radiate into highly multimodal fields. By measuring spectral projections of different modes and different points in the field and using the projections to compute weighted measures of average spectral properties of the modes, the spectral signatures of multimodal sources can be captured. An example of aggregate spectral properties that may be determined include the mean spectrum of the modes or the mean value of portions for filters on the modal spectra.

Unlike conventional scanning spectrometers, a multimode multiplex spectrometer of the present invention is static in that it simultaneously measures multimodal projections at the same instance in time. Measuring multimodal projections at the same instance in time reduces the need for moving parts and increases the speed at which spectral projections can be measured.

A multimodal multiplex spectrometer (MMS) according to the present invention analyzes a diffuse incoherent or partially coherent optical source. Such sources are "multimodal" because they are described by multiple modes in a coherent mode decomposition [1] using:

1. a spatially distributed array of optical detectors. Each detector may have a distinct spectral response or may have associated with it a distinct spectral filter.
2. targeted spectral response design. The spectral responses of the joint array of detectors are designed to enable efficient and accurate spectral density estimation or chemical species density estimation. In some cases, as in quantum dot detectors or photonic crystal structures, the distributed spectral responses may be randomly achieved. In other cases, as in thin film filters or volume holographic filters, the spectral responses are actively designed to achieve target analysis.
3. algorithms for target or spectral estimation from detector array data.

An MMS of the present invention may include spectrally diverse multiplex filters or detectors for spectral and target estimation. Spectral diversity means that different measurement values depend on a diversity of spectral channels in the field. For spectrally diverse multiplex filters, different measurement values depend on the amplitude of more than one spectral channel in the field. The filtering function in such systems contains multiple peaks. Multiplex spectroscopy generally relies on structured transformations, such as the Fourier transform of FT-IR spectroscopy. Using volume holograms, multichannel thin film filters, 3D structured photonic materials or circuits or nanostructured electronic detectors, MMS systems can be programmed to achieve arbitrary spectral responses in each detector element. Complex "matched" multichannel design is also possible for other filter technologies, for example by structured spatio-temporal sampling of two-beam interferometers.

The present invention may also include estimation of mean spectra or mean chemical densities of diffuse sources by sampling different spectral projections on distributed spatial sampling points. Conventional spectroscopy uses tightly focused beams and spatial filtering to estimate spectral characteristics of only a single mode. In principle, the spectral densities of different modes may vary. MMS spectrometers are designed such that "multiplex" measurements combine data from both spectral and modal distributions. The measurements are combined to measure average spectral or chemical densities over the modal distribution. However, it is not required to estimate the independent spectra of specific points or modes.

MMS systems according to the invention may also use randomly distributed spectral disparity from scattering of 3D structures or from nanostructure detector elements to achieve spatially distributed multiplex signals. MMS systems of the present invention may also use constrained optimization of distributed multiplex detectors to directly estimate source spectra or chemical densities.

Accordingly, it is an object of the invention to provide methods and systems for accurately and efficiently measuring spectral properties of diffuse sources.

It is another object of the invention to provide methods and systems for static multimode multiplex spectroscopy that use different multi-peak filter functions on each detector.

It is another object of the invention to provide methods and systems for combining measurements obtained by a multimode multiplex spectrometer of the invention to determine a property of a diffuse source.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
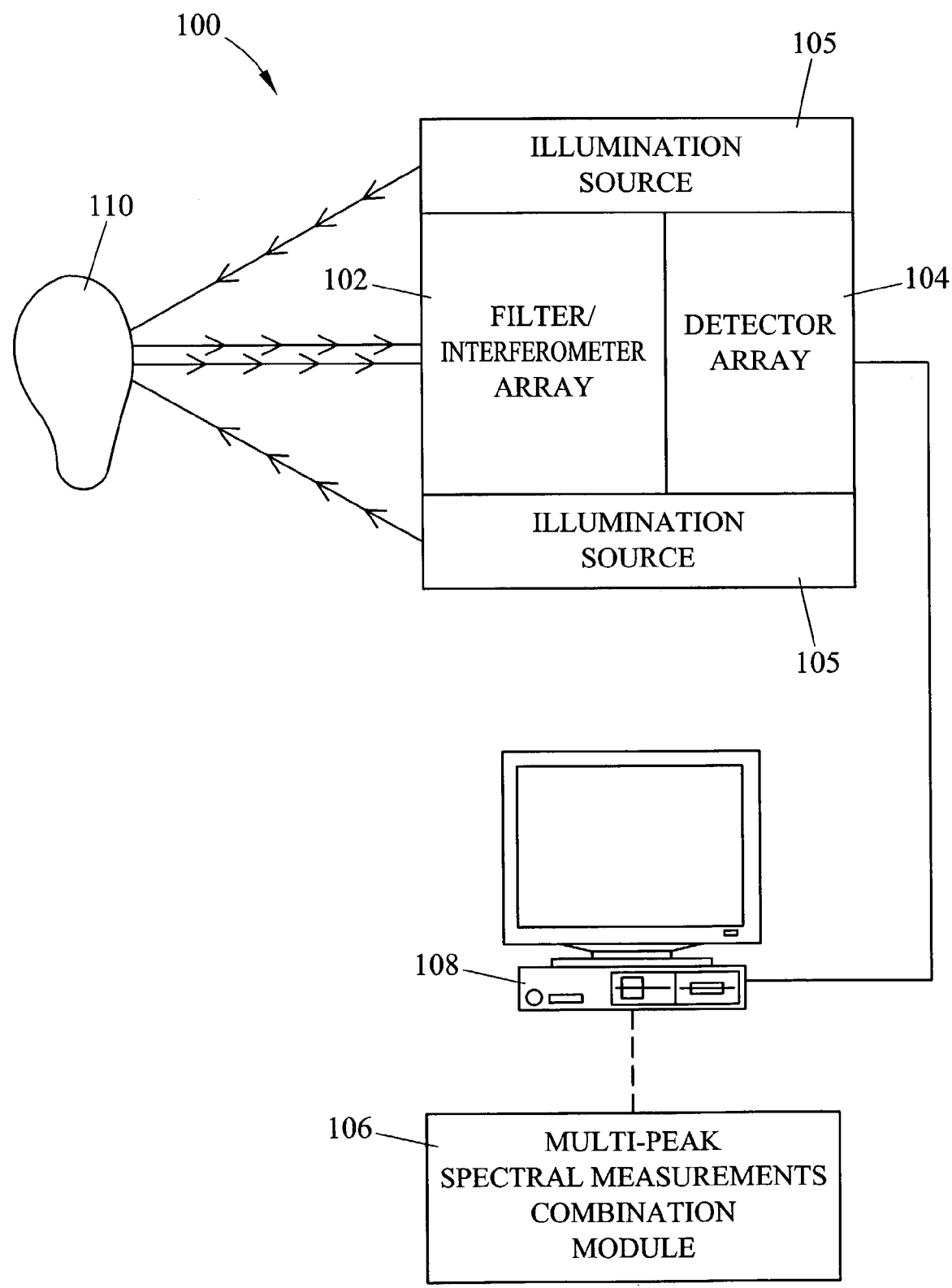
FIG. 1 is a block diagram of a system for static multimode multiplex spectroscopy according to an embodiment of the present invention.

The present invention includes methods and systems for simultaneously obtaining multi-peak spectral measurements from a diffuse source and for combining the multi-peak projections to determine a property of the source. FIG. 1 is a block diagram of a system for simultaneously obtaining different multi-peak spectral measurements from different points on a diffuse source and for combining the measurements to estimate a property of a diffuse source according to an embodiment of the present invention. Referring to FIG. 1, an exemplary system 100 includes a static filter or interferometer array 102, a detector array 104, illumination sources 105 and a multi-peak spectral measurements combination module 106 implemented on a computer 108. Static filter or interferometer array 102 includes a plurality of filters or interferometers for simultaneously obtaining different multi-peak spectral measurements emanating from a diffuse source 110. Detector array 104 converts the optical signals for each filtered multi-peak spectral measurement in to electrical signals and inputs the signals to computer 108. Illumination sources 105 illuminate diffuse source 110 for spectral analysis. Multi-peak spectral measurements combination module 106 combines the measurements to estimate a property of diffuse source 110.

Figure 2:
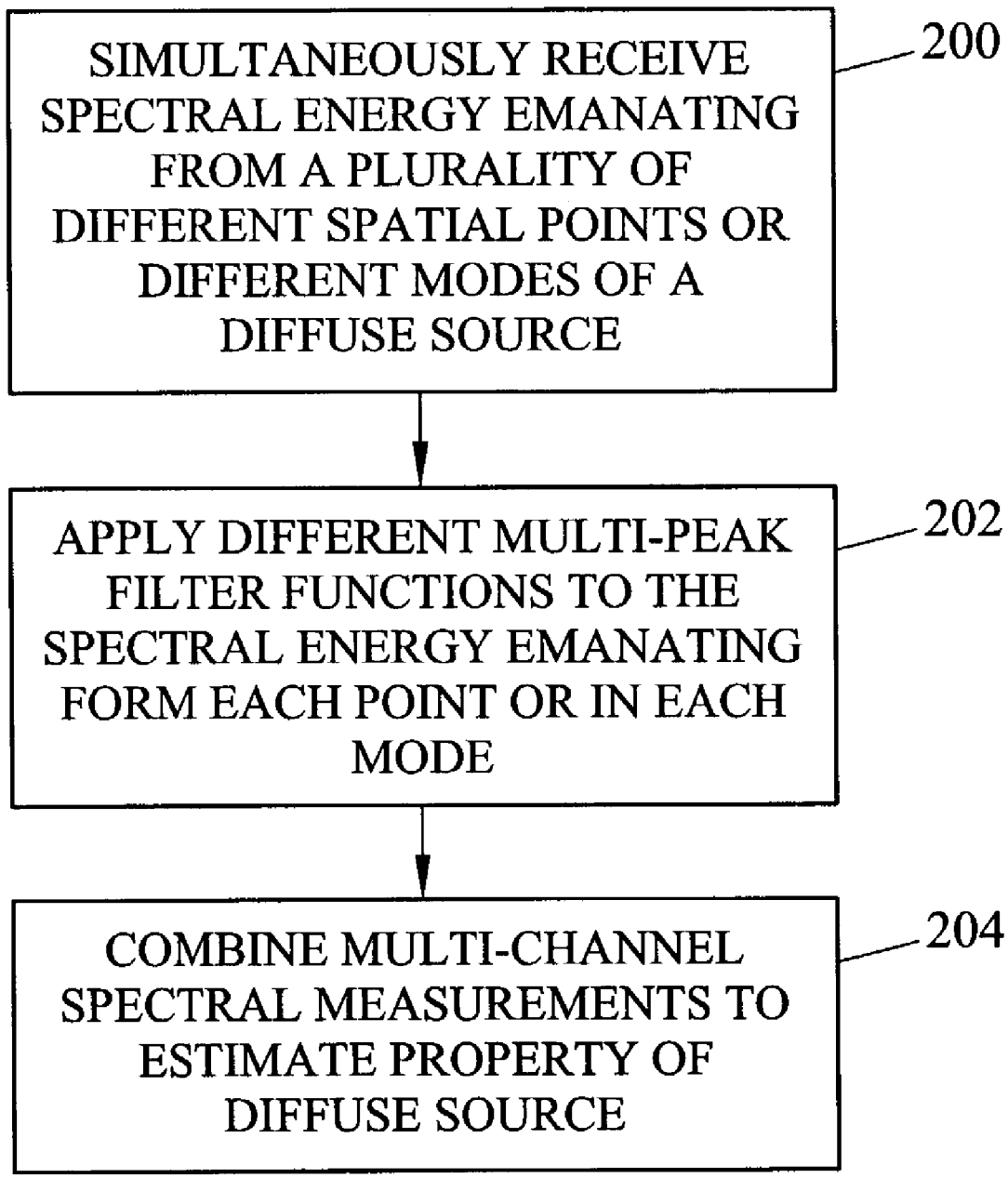
FIG. 2 is a flow chart illustrating exemplary steps for determining spectral properties of a diffuse source according to an embodiment of the present invention.

FIG. 2 is a flow chart illustrating the overall steps performed by the system 100 illustrated in FIG. 1 in measuring optical properties of diffuse source 110 using simultaneously-obtained multi-peak spectral measurements according to an embodiment of the present invention. Referring to FIG. 2, in step 200, the system 100 simultaneously receives spectral energy emanating from a plurality of different points of a diffuse source. In step 202, the system applies different multi-peak filter functions to the spectral energy emanating from each point. Examples of filter functions suitable for use in the present invention will be described in detail below. In step 204, the multichannel spectral measurements to which the filter functions were applied are combined to estimate a property of the diffuse source. For example, the multichannel spectral measurements may be combined to estimate the average spectrum of the source or the chemical composition of the source. Exemplary algorithms for combining the multichannel spectral measurements will be described in detail below.

Local Spectral Model

According to one embodiment of the invention, spectral content may be measured and analyzed separately for each spatial point of a diffuse source. In order to obtain a spectral measurement for each point in a diffuse source, an array of elemental detectors and filters may be used. The array of elemental detectors and filters may be positioned close to the source so that spectral energy emanating from each point can be distinguished. The spectral energy emanating from each point can be separately analyzed and used to compute a property of the diffuse source, such as the average spectrum. The procedure for separately analyzing spectral energy emanating from each point of a diffuse source is referred to herein as the local model because local spectral measurements are obtained for each point.

The system illustrated in FIG. 1 can be referred to as a static multimode multiplex spectrometer because it simultaneously measures different multi-peak spectral projections emanating from a diffuse source. The system illustrated in FIG. 1 may be used to measure spectral content of multiple spatial mode systems in which the spectral content of the modes is correlated. However, the system illustrated in FIG. 1 is not concerned with independently characterizing the spectral content of different modes. Rather, the system makes different multiplex measurements on different modes and uses this multiplex data to estimate global features of a diffuse source, such as the average mode spectrum or the density of specific target chemicals. Equation (1) shown below illustrates exemplary measurements made by each detector in detector array 104 illustrated in FIG. 1.

$$m(r) = \int I(v,r) h(v,r) dv \qquad (1)$$

In Equation (1), $I(v,r)$ is the spectral intensity distribution as a function of frequency $v$ and radius $r$, $h(v,r)$ is a spatially localized spectral response or filter function. The measurement at a single point $r$ of the form shown in Equation (1) is referred to herein as a spectral projection. As will be described in more detail below, each filter in filter array 102 may have a different multi-peak filter function $h(v,r)$. The filter functions $h(v,r)$ are preferably selected so that the filter functions are invertible, tailored to the expected properties of the source being analyzed, and different from each other. Exemplary filter functions suitable for use with embodiments of the invention will be described in detail below. Definitions for variables used in the equations herein are listed in the Appendix at the end of this specification.

Measurements of local projections of the power spectrum are much easier to make than measurements of the full power spectrum at each point or in each mode. Nevertheless, these reduced measurements are useful in estimating source parameters, such as the mean spatially integrated power spectrum. The mean spectrum may be defined as $$\overline{S}(v) = \frac{1}{A} \int_A I(v,r) dr \qquad (2)$$

where the integral is averaging is over a source area or volume A.

As an example of how Equation (1) can be used to estimate the mean spectrum $\overline{S}(v)$, it can be assumed that there exist contours in $R^2$ over which $h(v,r)$ is constant. Integrating along these contours, the following equation is obtained:

$$\overline{S}(v) = \int \int h^{-1}(v^{-1},l) m(r) dl_{\square} dl_{\perp} m(l) = \int \overline{S}(v) h(v,l) dv \qquad (3)$$

where $l$ is a parameter along curves orthogonal to the contours. Assuming further that there exists $h^{-1}(v,l)$ such that $\int h^{-1}(\lambda',l) h(v,l) dl = \partial(v'-v)$, $\overline{S}(v)$ can be estimated using the following equation $$\overline{S}(v) = \int \int h^{-1}(v^{-1},l) m(r) dl_{\square} dl_{\perp} \qquad (4)$$

For example, for a two-beam interferometer or multichannel fiber system, one might choose $h(v,r) = \cos(2\pi\alpha vx/c)$. In this case the contours of integration are lines along the y axis. And the following measurements are obtained:

$$m(x) = \int \left[ \int S(v,r) dy \right] \cos\left(\frac{2\pi\alpha vx}{c}\right) dv \qquad (5)$$

$$= \int \overline{S}(v) \cos\left(\frac{2\pi\alpha vx}{c}\right) dv$$

Equation (4) is the easily inverted Fourier cosine transformation of $\overline{S}(v)$. In practice, this function is sampled at discrete values of x, which yields a discrete cosine transformation of the spectral density.

More generally, both the target spectrum and the measured values may be considered discretely. In this case the transformation between the target spectrum and the measurements takes the form of a linear relationship between a vector describing the target spectrum, $\vec{s}$, and a vector describing the measurement state, $\vec{m}$ of the form $\vec{m} = H\vec{s}$. Formally, one may estimate the target spectrum as $\vec{s}_e = H^{-1}\vec{m}$, although nonlinear estimation algorithms may improve the reconstruction fidelity. In cases where the rank H is less than the number of components in $\vec{s}$, nonlinear techniques in combination with target constraints, such as that the components of the vector must be nonnegative or that the target source consists of a discrete number of active channels, may be needed for target estimation.

Thus, multi-peak spectral measurements combination software 106 may have access to the inverse filter functions $h^{-1}(v',r)$ for each filter function $h(v',r)$ implemented by array 102. Software 106 may calculate the average spectrum for each filter function by multiplying the measurement for that filter function and the inverse of the filter function and integrating over the area of the source using Equation (4). The average spectrum for each section of the source can then be added to determine the average spectrum of the source.

In considering the local model for multimodal analysis, it is not necessary to assume that $I(v,r)$ is confined to a plane or even a manifold. It can be assumed that present invention samples spectral projections at a sufficiently large set of such that inversion according to Equation (4) is well conditioned without requiring that the support of the sample point be compact.

Modal Spectral Model

Equation (1) assumes a spectrally filtered version of the field can be captured at a point. Obtaining spectrally filtered versions of a field at each point of a diffuse source may be accomplished by incorporating nanostructured electronics or non-homogeneous atomic systems in static filter array 102. For example, a quantum dot spectrometer [5] that achieves a spatially localized spectral projection will be described in detail below. In an alternate embodiment, spectral projections may be captured by focusing each spatial point of a source into a fiber and using a static interferometer on each fiber output to capture a projection. However, this approach would result in an unwieldy and complex instrument that would be difficult to manufacture. Exemplary implementations for capturing spectral projections at individual points of a diffuse source will be discussed in detail below in the section labeled "Implementations."

In yet another alternate embodiment of the invention, rather than measuring spectral projections at each individual point of a diffuse source, it may be desirable to measure projections of different modes, apply different multi-peak filter functions to each mode, and combine the measurements from each mode to estimate a spectral property of the diffuse source. Modal measurements can be taken at a location spaced from the source and do not require elemental detectors. Hence, modal-based instruments may be less complex than the elemental-based instruments describe above.

In most spectrometers, spectrally selective measures of the field are obtained via propagation through an interferometer or filter rather than by local sampling. In these systems multi-peak spectral measurements combination module 106 may analyze the projection of the field measured by detector array 104 using a modal theory based on optical coherence functions. In one embodiment, software 106 uses the coherent mode decomposition of the cross-spectral density. The cross-spectral density is defined as the Fourier transform of the mutual coherence function $\Gamma(r_1,r_2,\tau)$ [1]

$$W(r_1,r_2,v) = \int \Gamma(r_1,r_2,\tau)e^{-i2\pi v\tau}d\tau \qquad (6)$$

$W(r_1,r_2,v)$ is Hermitian and positive definite in transformations on functions of $r_1$, and $r_2$, by which properties one can show that it can be represented by a coherent mode expansion of the form $$W(r_1, r_2, v) = \sum_n \lambda_n(v)\phi_n^*(r_1, v)\phi_n(r_2, v) \qquad (7)$$

where $\lambda_n(v)$ is real and positive and where the family of functions $\phi_n(r,v)$ are orthonormal such that $\int \phi^*_m(r,v)\phi_n(r,v)d^2r = \delta_{mn}$.

As discussed above, the present invention may use MMS to estimate the mean spectrum of an intensity distribution on an input plane, $I(v,r)$. In terms of the cross spectral density, this input intensity is $I(v,r)=W(r_1,r_1, v)$.

An MMS is a linear optical system that transforms the coherent modes under the impulse response $h(r,r',v)$. After propagation through the system the cross-spectral density is $$\tilde{W}(r_1, r_2, v) = \sum_n \lambda_n(v)\psi_n^*(r_1, v)\psi_n(r_2, v) \qquad (8)$$

where $\psi_n(r,v)=\int\phi_n(r',v)h(r,r',v)d^2r'$ and the functions $\psi_n(r,v)$ are not necessarily orthogonal [6]. The MMS records measurements of the form $$m_i = \int_{A_i}\int \tilde{W}(r, r, v)dvdr \qquad (9)$$
$$= \int_{A_i}\int \sum_n \lambda_n(v)\psi_n^*(r, v)\psi_n(r, v)dvdr$$
$$= \int \sum_n \lambda_n(v)\left[\int\int \phi_n^*(r', v)\phi_n(r'', v)H_i(r', r'', v)d^2r'd^2r''\right]dv$$
$$= \int \sum_n \lambda_n(v)\tilde{H}_i^n(v)dv$$

where $A_i$ is the surface area of the $i^{th}$ detector in detector array 104 and $$H_i(r', r'', v) = \int_{A_i}h^*(r, r', v)h(r, r'', v)dr$$

and $\tilde{H}_i^n(v) = \int\int \phi_n^*(r',v)\phi_n(r'', v)H_i(r',r'',v)d^2r'd^2r''$.

As with the local model, one goal of MMS is to estimate the mean spectrum, which in this case is $$\bar{S}(v) = \frac{1}{N}\sum_n \lambda_n(v).$$

The spectral content of the modes is assumed to be highly correlated, and it can be assumed that $\lambda_n(v)=\bar{S}(v)-\Delta\lambda_n(v)$ such that $$m_i = \int \bar{S}(v)\bar{H}_i(v)dv - \int \sum_n \Delta\lambda_n(v)\tilde{H}_i^n(v)dv \qquad (10)$$

-continued $$\approx \int \overline{S}(\nu) \overline{H}_i(\nu) d\nu$$

where $$\overline{H}_i(\nu) = N \sum_n \tilde{H}_i^n(\nu),$$

assuming that $$\left\langle \int \sum_n \Delta \lambda_n(\nu) \tilde{H}_i^n(\nu) d\nu \right\rangle = 0.$$

The goal of MMS design is to create a sensor such that Equation (10) is well conditioned for inversion. Thus, similar to the local model discussed above, the software 106 may estimate the average spectrum of a diffuse source using Equation (4).

Chemical or Biological Analysis Model

An MMS system according to the present invention may also be modeled as a direct measure of chemical or biological species. Let $c_i(r)$ represent the concentration of spectral species i at position r. Suppose that species i generates a spectrum $s_i(\nu)$. An MMS system measures spectral positions at diverse positions r. The overall spectrum at r is $$S(\nu, r) = \sum_i c_i(r) s_i(\nu).$$

Measurements take the form $$m(r) = \int S(\nu, r) h(\nu, r) d\nu$$
$$= \sum_i c_i(r) \int s_i(\nu, r) h(\nu, r) d\nu$$
$$= \sum_i H_i(r) c_i(r)$$

where $H_i(r) = \int s_i(\nu,r) h(\nu,r) d\nu$. If the measurements are considered as discrete digital samples integrated over a finite spatial range (i.e.

$$m_j = \int_{A_j} m(r) dr$$

where $A_j$ is the area of the $j^{th}$ sensor) and it is assumed that the concentration distribution as observed by the sensor represents the mean, the transformation between the concentrations and the measurements take the form $$m_j = \sum_i H_{ji} \overline{c}_i.$$

In some cases this transformation may be linearly invertible for the mean concentrations $\overline{c}_i$. In most cases, however, the measurements either over constrain or under constrain the concentrations. In these cases, well known algorithms as partial least squares (PLS) may be used to estimate one or more target concentrations [7–11].

The spectral projection kernels $h(\nu,r)$ should be designed to make estimation of the $\overline{c}_i$ tractable and efficient. The exact filter design arises from the PLS algorithm. One may recursively optimize $h(\nu,r)$ in simulation using PLS to achieve maximal fidelity. Design of $h(\nu,r)$ may consist of sampling and geometric design in the case of interferometers, but is more likely to occur through hologram, thin film filter or photonic crystal design. The design methodology for these processes is discussed below.

Implementations

Spectrometers may be subdivided into various classes, such as dispersive or multiplex and scanning or static [12]. A dispersive spectrometer separates color channels onto a detector or detector array for isomorphic detection. A multiplex spectrometer measures linear combinations of spectral and temporal channels. Arrays of multiplex data are inverted to estimate the spectral density. A scanning spectrometer functions by mechanical or electro-optic translation of optical properties, as in a rotating grating or a moving mirror. A static interferometer captures full spectra in a single time step by mapping wavelength or multiplex measurements onto a static sensor array. Static grating spectrometers based on linear detector arrays have been available for some time; while static multiplex spectrometers have emerged over the past decade [13–22].

Spectrometers may be characterized on the basis of many factors, including etendue and acceptance angle, throughput, spectral resolution and resolving power. The etendue is the integral of the differential product of the solid angle of emissions over the surface of the source. The etendue may be considered roughly as the input area times the acceptance angle of the spectrometer. The throughput is the photon efficiency of the instrument. The spectral resolution is the resolution of the reconstructed spectrum. The resolving power is the ratio of the center wavelength of the reconstructed spectrum to the spectral resolution. For grating spectrometers, the spectral resolution of an instrument and the etendue are proportional.

Optical fields may be described in terms of spatial and temporal modes. The modes of a system form a complete set of self-consistent solutions to the boundary conditions and wave equations within that system. Spectroscopy measures the spectral content of optical fields by measuring the mode amplitudes as a function of wavelength. In general, spectrometers employ spatial filtering to restrict the number of spatial modes in the system. This restriction is necessary because mechanisms for determining spectral content usually assume that the field is propagating along a common axis through the system. Imaging spectrometers, in contrast, independently measure the spectrum of multiple spatial modes.

Optical spectrometer design is motivated by the fact that optical detectors are not themselves particularly spectrally sensitive. Most electronic detectors have spectrally broad response over a wide range. Optical components, such as gratings, filters, interferometers, etc., preprocess the field prior to electronic detection to induce spectrally dependent features on the intensity patterns sensed by spectrally insensitive electronic devices. However, as will be described below quantum dot detectors could change this situation [5].

The following methods may be used in filter/interferometer array 102 and detector array 104 to implement the transformation of Equation (1)

Two-Beam Interferometers

In one embodiment, static filter/interferometer array 102 and detector array 104 may be implemented using a two-beam interferometer. A two-beam interferometer, such as a Michelson, Mach-Zender, Sagnac or birefringent system, separates the source with a beam splitter or polarizer and recombines it on a detector. Two-beam interferometers have long been used as scanning Fourier transform spectrometers. In this implementation, the relative optical path along the arms of the interferometer is scanned and the optical signal is measured as a function of time delay. If the transformation from a source plane to the interferometer output plane is imaging, these instruments can function as "hyperspectral" cameras in which each pixel contains high resolution spectra. Over the past decade, there has been increasing emphasis on "static" Fourier transform interferometers. In a static interferometer, the spectrum is measured in a single shot [8–13, 15, 17]. Advantages of static interferometers include reduced dependence on mechanical components, compact and stable implementation and lowered cost.

Figure 3:
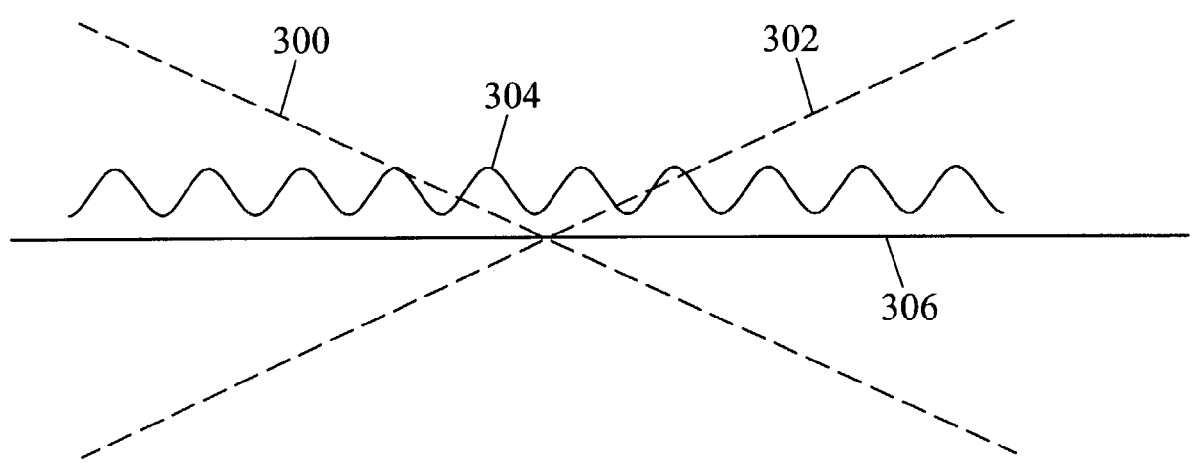
FIG. 3 is a schematic diagram illustrating the operation of a two-beam interferometer.

In one embodiment, static filter/interferometer array 102 and detector array 104 may be implemented using static interferometers for large etendue sources. A static two-beam interferometer captures a spectrum in a single shot by measuring the signal generated by colliding wavefronts. FIG. 3 illustrates an example of the operation of a static two-beam interferometer. In FIG. 3, the colliding wavefronts 300 and 302 induce an interference pattern 304 on sensor plane 306 that can be inverted to describe the spectrum of the source. The beam paths in two-beam interferometers delay and redirect the direction of propagation of the interfering waves. In FIG. 3, the wavefronts 300 and 302 intersect at their midpoints, which can be achieved in imaging and source doubling interferometers. Other designs, notably Michelson systems, introduce a shear in addition to the tilt between the wavefronts.

Figure 4:
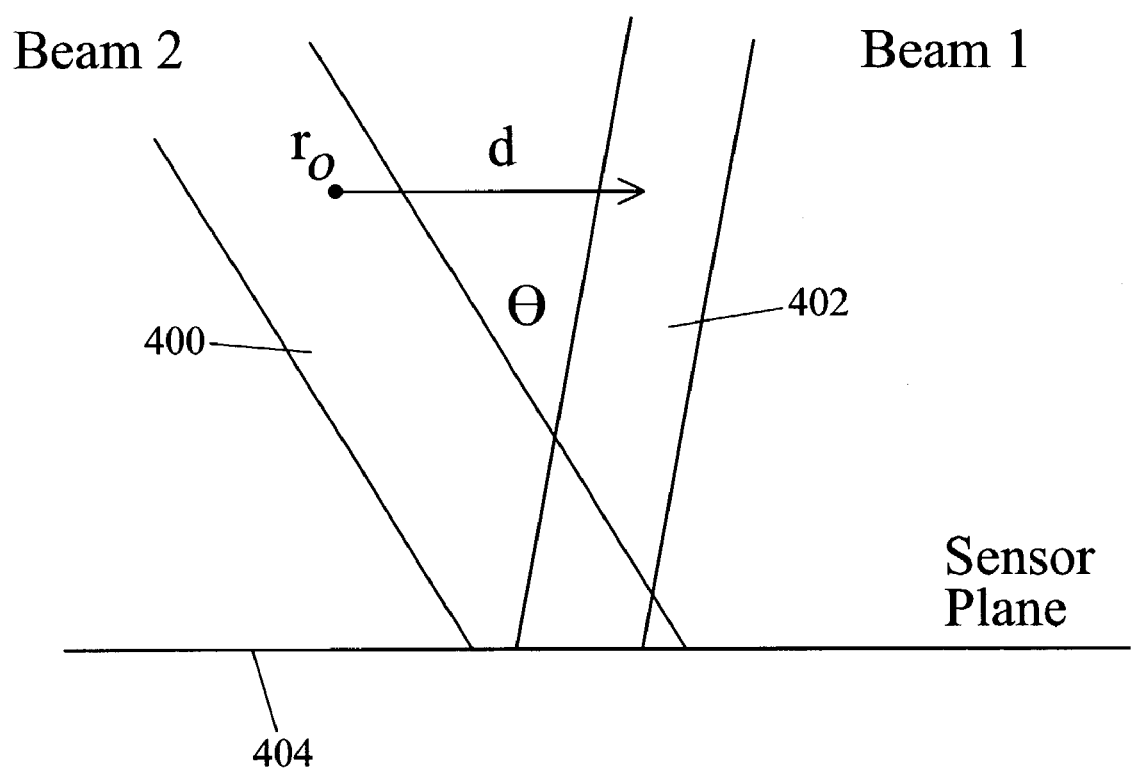
FIG. 4 is a schematic diagram illustrating wave geometry in a static two-beam interferometer.

Two-beam interferometers may be further subdivided into null time delay and true time delay instruments. True time delay instruments transversely modulate the beams with a lens or other imaging instruments to reproduce the field with a delay. Despite the variety of mechanisms that create two-beam interference, uniform wavefront two-beam interferometers can be described using a relatively small number of parameters in a simple model. A two-beam interferometer interferes the beam radiated from a source with a rotated, translated and delayed version of the same beam (the possibility of a change in spatial scale is discounted for simplicity.) FIG. 4 illustrates the relative geometry of two beams 400 and 402 in a two-beam interferometer. In FIG. 4, the signal produced on sensor plane 404 is the mean superposition of the fields along the two arms.

$$m(r) = \Gamma(r,r,0) + \Gamma(r',r',0) + \Gamma(r,r',\tau) + \Gamma(r',r,\tau) \quad (11)$$

where $\Gamma(r,r',\tau)$ is the mutual coherence between points r and r' for time delay $\tau$. The effect of the interferometer is to rotate and displace and delay one beam relative to the other. The transformation is described by $$r' = R_{\theta\phi}(r - r_o) + d \quad (12)$$
$$= R_{\theta\phi} r + d'$$

where $R_{\theta\phi}$ is a rotation about the center point $r_0$ and d is a displacement. In a static instrument, $R_{\theta\phi}$, $d'=r_0+d$, and $\tau$ are fixed. System design consists of selecting these parameters and the sampling points and integration areas for the measurements defined by Equation (11).

As described above, an object of the present invention is measuring spectral content of spatially broadband "incoherent" sources. The coherent mode decomposition for such a source can be expressed in terms of any complete set of modes over the spatio-spectral support of the field. Using a plane wave decomposition, the mutual coherence can be modeled as $$\Gamma(r_1, r_2, \tau) = \sum_{l,m,n} \alpha_{lmn} \exp(-jk_{lmn} \cdot (r_1 - r_2)) \exp\left(j\frac{c\tau}{|k_{lmn}|}\right) \quad (13)$$

where $$k_{lmn} = \frac{2\pi l}{L_x} i_x + \frac{2\pi m}{L_y} i_y + \frac{2\pi n}{L_z} i_z.$$

One goal of static MMS according to the present invention is to measure the mean spectrum, which in this case is $$\bar{S}(\nu) = \frac{1}{A}\int \Gamma(r, r, \tau) e^{-j2\pi\nu\tau} dr d\tau \quad (14)$$
$$= \sum_{l,m,n} \alpha_{lmn} \delta\left(\nu - \frac{c}{|k_{lmn}|}\right)$$

The quantity that a two beam interferometer measures, however, is $$\Gamma_p(r, r, \tau) = \quad (15)$$
$$\sum_{l,m,n} \alpha_{lmn} \exp(-jk_{lmn} \cdot (I - R_{\theta\phi}) \cdot r) \exp(jk_{lmn} \cdot d') \exp\left(j\frac{c\tau}{|k_{lmn}|}\right)$$

$\tau$ may be non-zero, but it is fixed for a given measurement.

Generally, an interferometer measures $\Gamma(r,r',\tau)$ at a fixed time over a simple manifold, such as a plane. The power spectrum of the source is estimated by taking a spatial Fourier transform along one or more dimensions in the plane, which yields $$S_p(u, \tau) = \sum_{l,m,n} \alpha_{lmn} \exp(jk_{lmn} \cdot d') \exp\left(j\frac{c\tau}{|k_{lmn}|}\right) \text{sinc}([u - [k'_{lmn}]_{\Box}]A) \quad (16)$$

where A is the extent of the sensor plane and assume that the origin of r lies on the sensor plane. $k_{lmn}'=k_{lmn}\cdot(I-R_{\theta\phi})$ and $[k_{lmn}']\|$ is the component of $k_{lmn}'$ parallel to the sensor plane.

Any non-zero value for d' substantially reduces the bandwidth in $k_{lmn}$ over which Equation (16) may be used to extract the estimated spectrum of Equation (14). Since by definition a large etendue spectrometer must accept a large bandwidth in $k_{lmn}$, spectrometers for which the point of rotation for the interfering beams is not in the sensor plane are not well suited for implementing filter array 102 and detector array 104. Static Sagnac, Mach-Zender and birefringent spectrometers are capable of producing a center of rotation within the sensor plane and are therefore suitable for use as filter array/spectrometer 102 and detector array 104 according to the present invention. For these sensors, Equation (15) may be used to estimate $\bar{S}(v)$ to the extent that one can assume that $[k_{lmn}']\|$ can be associated with $|k_{lmn}|$. Since spatial frequency resolution in $S_p(u,\tau)$ is 1/A, it can be assumed that no ambiguity results if the longitudinal bandwidth of $k_{lmn}$ is less that 1/A. Since the spectral resolution in estimating $\bar{S}(v)$ will be c/A, for a simple two beam interferometer, spectral resolution and etendue are inversely related. A simple static interferometer, even with image transfer between the source and sensor planes and rotation in the sensor plane, cannot simultaneously maintain high spectral resolution and high etendue. The following sections consider alternative designs to overcome this challenge.

Static Two-Beam Interferometer for Multimode Multiplex Spectroscopy

Figure 5:
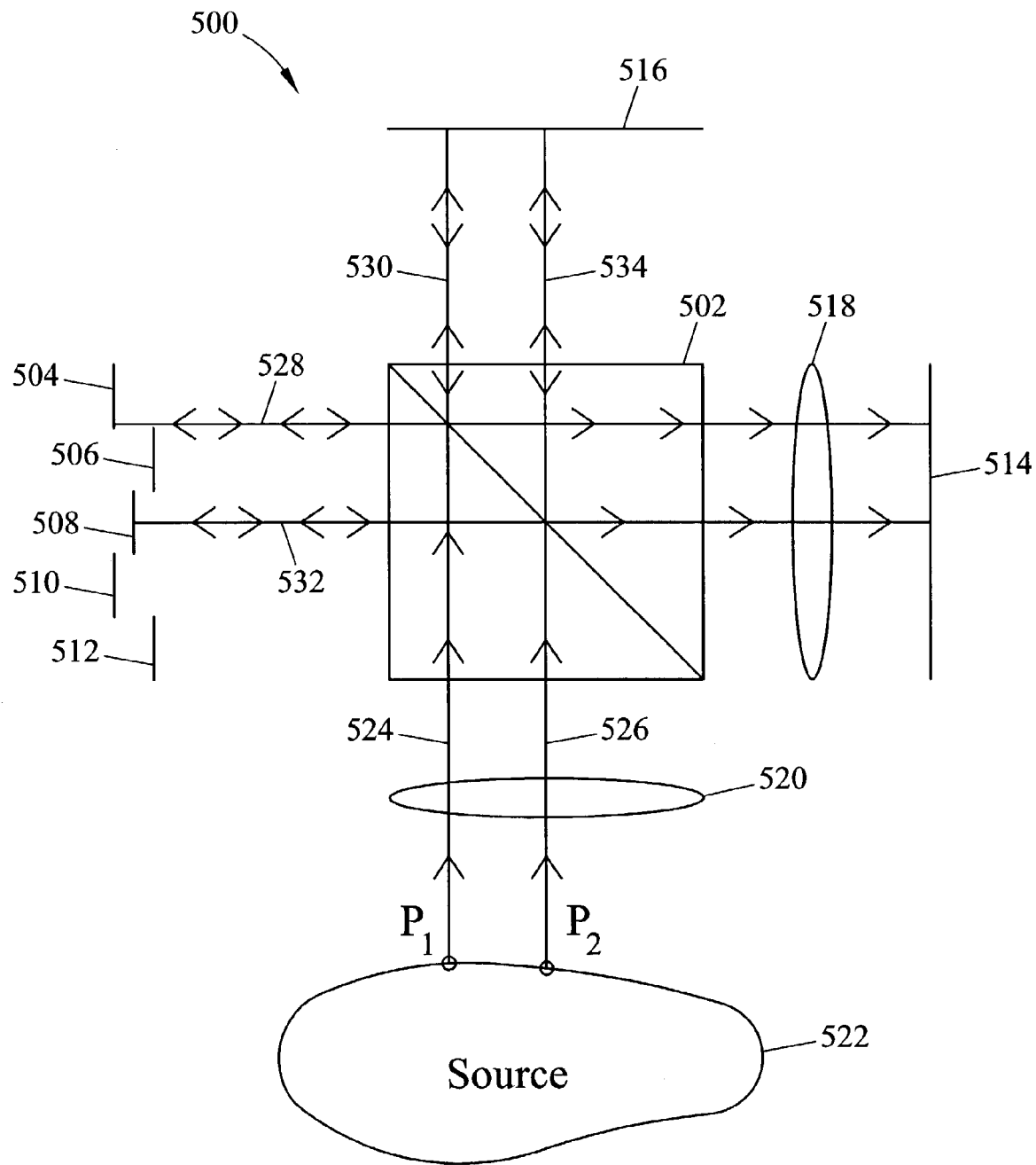
FIG. 5 is a schematic diagram illustrating a static two-beam interferometer suitable for performing static multi-mode multiplex spectrometry according to an embodiment of the present invention.

FIG. 5 illustrates an example of a static two-beam interferometer suitable for multimode multiplex spectroscopy according to an embodiment of the present invention. Referring to FIG. 5, interferometer 500 includes a beam splitter 502 and a plurality of mirrors 504–512 located at different distances from a detector 514. In addition, interferometer 500 includes a mirror 516, and imaging optics 518 and 520. Beam splitter 502 may be any suitable type of beam splitter for splitting the optical power of a received signal. Mirrors 504–512 may be any suitable type of mirrors capable of reflecting optical energy. Mirrors 504–512 are preferably located at different distances from detector 514 so that the interference pattern produced by each detector for each point on diffuse source 522 is different. Mirror 516 may be any suitable mirror for reflecting incident energy back to beam splitter 502. Imaging optics 518 and 520 may be lenses for projecting points of source 522 onto mirror 516 and detector array 514. Detector array 514 may be any suitable type of detector capable of detecting optical energy.

In the illustrated example, beam splitter 502 receives light rays 524 and 526 emanating from points P1 and P2 on source 522. Light ray 524 enters beam splitter 502 and is split into components 528 and 530. Similarly, light ray 526 is incident on beam splitter 502 and is split into components 532 and 534. Light ray component 528 is reflected by mirror 504 proceeds back through beam splitter 502, through optics 518 and is focused on detector array 514. Similarly, component 530 is reflected by mirror 516 and by beam splitter 502 through optics 518 and onto detector array 514. The interference of light ray components 528 and 530 produces an interference pattern for point P1 on detector array 514. Similarly, the interference of light ray components 532 and 534 produces an interference pattern for point $P_2$ on detector array 514.

According to an important aspect of the invention, the difference in distance between interference light paths for different points on source 522 preferably varies. For example, the distance traveled by light ray component 528 is preferably different from the distance traveled by light ray component 532 in reaching detector array 514. Assuming that the spectra of different points on source 522 are related, the interference patterns for the different points detected by detector array 514 can be used to estimate a property of the source 522, such as the chemical composition or the average spectrum.

Sampled Interferometers

The challenge of using measurements of the form represented by Equation (15) to estimate $\bar{S}(v)$ can be addressed by revised sampling strategies for $\Gamma(r,r',\tau)$. The most direct approach is to sample as a function of $\tau$. True time delays can be introduced in the field by waveguiding or by imaging. The waveguiding approach may include coupling each point in the source plane through a different fiber interferometer.

Figure 6:
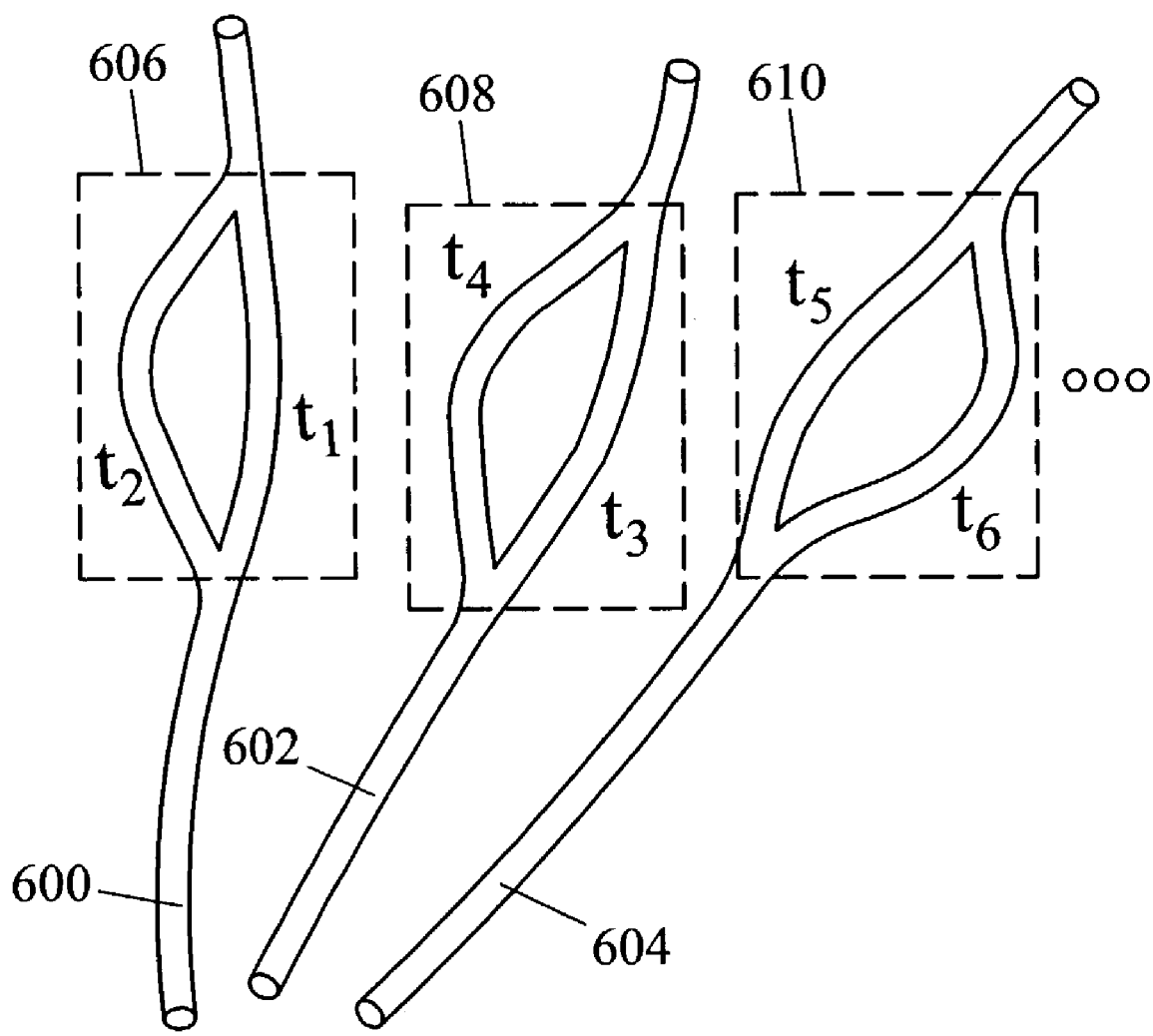
FIG. 6 is a schematic diagram of a sampled interferometer suitable for obtaining multi-peak spectral measurements from a plurality of different points of a diffuse source according to an embodiment of the present invention.

FIG. 6 illustrates a sampled interferometer in which each optical fiber includes a different fiber interferometer according to an embodiment of the present invention. Referring to FIG. 6, a plurality of optical fibers 600, 602, and 604 measures spectral projections emanating from different points of a source of interest. Each optical fiber 600, 602, and 604 may include a different fiber interferometer with different relative interference delay. For example, optical fiber 600 may include an in-line interferometer 606 including different optical path lengths that result in a time delay $t_2$ minus $t_1$. Optical fiber 602 may include an in-line interferometer 608 with different optical path lengths such that the interference delay is equal to $t_4$ minus $t_3$. Optical fiber 604 may include an in-line interferometer 610 with a delay of $t_{6\ minus\ t5}$. In a preferred embodiment of the invention, $(t_6-t_5)\neq(t_4-t_3)\neq(t_2-t_1)$. Using different interference delays for each optical fiber enables different multi-peak filter functions to be obtained for each point of a diffuse source. Assuming that the spectra of the different points on the source are related, overall spectral properties of the source can be determined.

In moving from a two-beam interferometer to a fiber array, the measurements implemented by filter array/interferometer 102 and detector 104 change from continuous transform systems to discrete sampling. While a two-beam interferometer samples by integrating on pixels across a plane, more general devices consist of discrete 3D structures and sample more general space time points in $\Gamma(r,r',\tau)$. A segmented two-beam interferometer is another example of a sampled system suitable for use with the present invention. Such an interferometer may include an array of static two beam interferometers, based on Sagnac or Wollaston designs. Each interferometer may use imaging optics to induce a true coarse time delay between the beams and tilt to induce a fine propagation time delay. The aperture of the interferometers is preferably matched to the etendue of the source. The main advantage of an array of two-beam interferometers is that the number of discrete devices is much reduced relative to the fiber array approach. One may view these approaches as a spectrum spanning the effective number of time delays per interferometer from one to N. The acceptance angle of the system falls as the number of time delays per interferometer increases. In view of this trade-off and the manufacturing complexity and cost of making an array of interferometers, this approach may be less preferable than other approaches. Filters may be more cost-effective to implement than sampled interferometers. Accordingly, exemplary filter implementations are described in detail below.

Filters

Figure 7A:
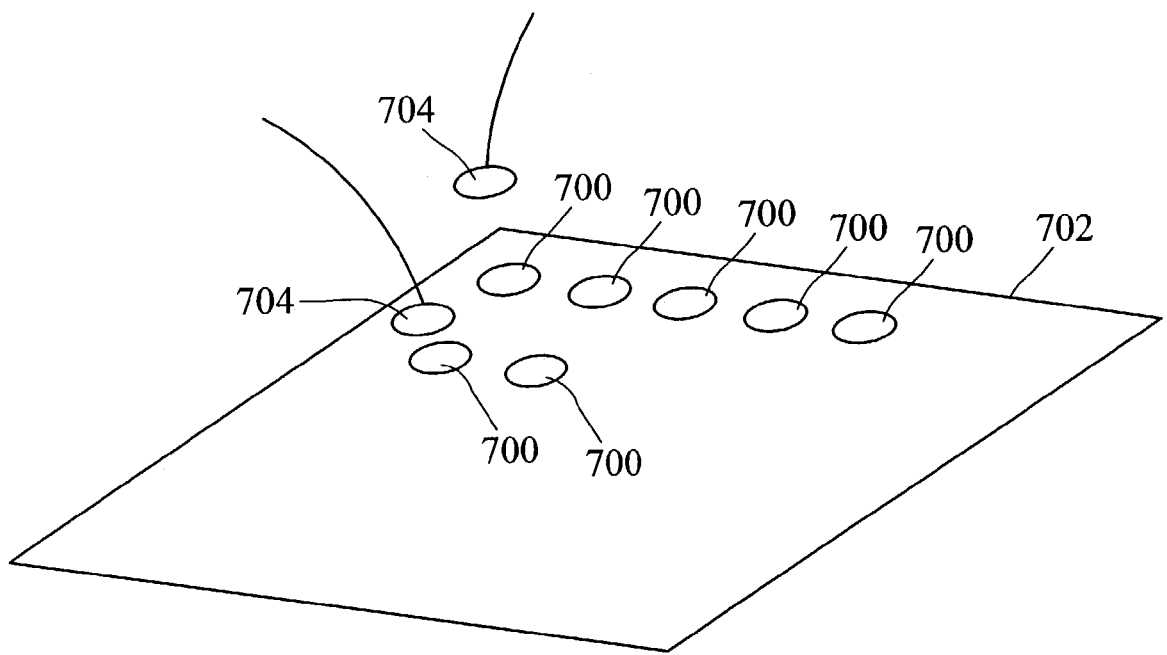
FIG. 7A is a perspective view of a plurality of discrete filter elements and discrete detectors for obtaining multi-peak spectral measurements emanating from different points of a diffuse source according to an embodiment of the present invention.
Figure 7B:
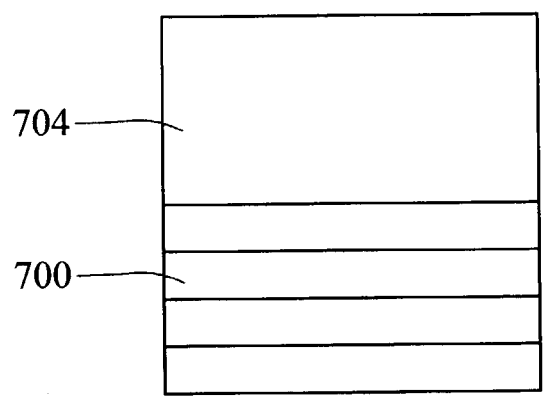
FIG. 7B is a side view of an elemental detector and a filter element illustrated in FIG. 7A.

The filter approach to MMS seeks to directly implement measurements of the form shown in Equation (1). As in the previous section, measurements are implemented in discrete form. FIG. 7A illustrates an exemplary filtered detector array suitable for use with embodiments of the present invention. Referring to FIG. 7A, a plurality of filters 700 are located on a source plane 702. A detector 704 may be located on each filter 700. Each filter 700 may implement a different multi-peak filter function $h_i(v)$. In FIG. 7B, each filter 700 may include a plurality of layers. The layers for each filter implement the filter functions $h_i(v)$. Each detector makes a measurement of the form.

$$m_i = \int\int_{A_i} I(v, r)h_i(v)dvdr \quad (17)$$

where $A_i$ is the area of the ith detector element. Filters 700 may include absorptive materials, as in color cameras, or interference filters. In contrast with cameras, many different filter functions $h_i(v)$ may be implemented. In order to achieve the throughput advantage of multiplex spectroscopy [23], each filter 700 integrates a broad sample of the source spectrum. Design of the filter functions for high fidelity and high resolution reconstruction of the source is weighing design problem.

The primary disadvantages of the absorptive approach are lack of spectral resolution and lack of programmability. The advantages of the absorptive approach are that the filters may in principle be very thin. The disadvantages of the interference approach are that the filters use propagation to filter and thus must be relatively thick. Interference filters may also be relatively challenging to fabricate to precise specifications and their response may depend on angle of incidence, thus limiting the etendue over which they are effective. Accordingly, four approaches to filters suitable for use with the present invention will now be described: layered media, volume holograms, 3D structured materials and absorptive media.

The simplest thin film filters consist of a layered stack of media of different refractive indices. Commonly, such filters are constructed using periodic stacks. Wavelengths and waves resonant with the filter are selectively reflected or transmitted. Limited angular acceptance is of the primary disadvantages of conventional thin film filters, but they can be optimized for high angular degeneracy. Recently, a group at MIT has shown that a thin film filter may be designed to selectively reject all light at a given wavelength, independent of angle of incidence [24–39]. This filter acts as a very high etendue wavelength selector.

Figure 8:
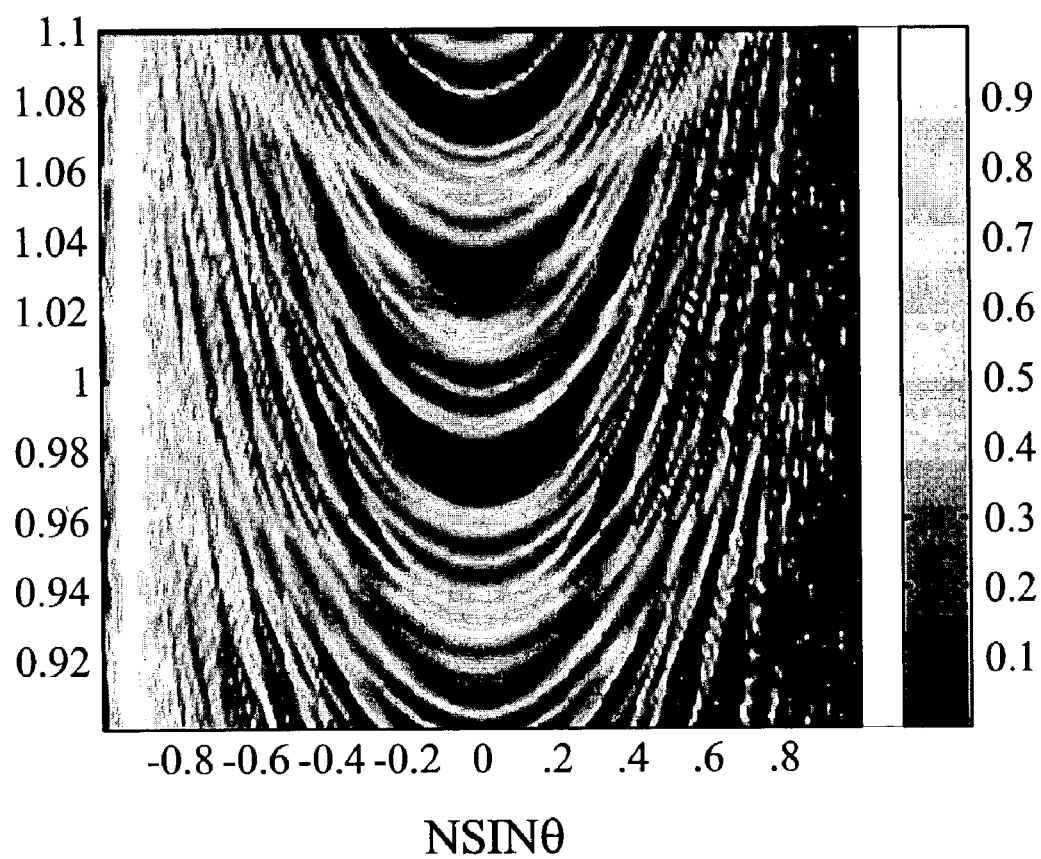
FIG. 8 is a spectral band diagram for a thin film filter suitable for obtaining multi-peak spectral measurements from different points of a diffuse source according to an embodiment of the present invention.

For multiplex spectroscopy, a filter with high angular invariance but also broad and nearly random spectral response is preferred. Such filters have been shown to be possible through simulation. FIG. 8 shows the band diagram for a thin film filter consisting of 10 layers with alternating refractive indices of 1.5 and 2.5. The layer thicknesses are uniformly and randomly distributed between zero and ten times the free space center wavelength. In FIG. 8, the values on the negative side of the horizontal axis reflect transmission of the TM mode as a function of frequency scaling from 0.9 to 1.1 times the central wavelength. The horizontal scale is the transverse wavenumber $n \sin \theta$ running from normal incidence to incidence from air along the surface of the filter. The values on the positive side of the horizontal axis represent the transmission of the TE mode as a function of incident wavenumber and relative frequency.

Ideally, for a high etendue filter, the bright bands of transmission in FIG. 8 would be horizontal. Curvature in these bands corresponds to variation in the transmission at a single wavelength as a function of angle of incidence.

Figure 9:
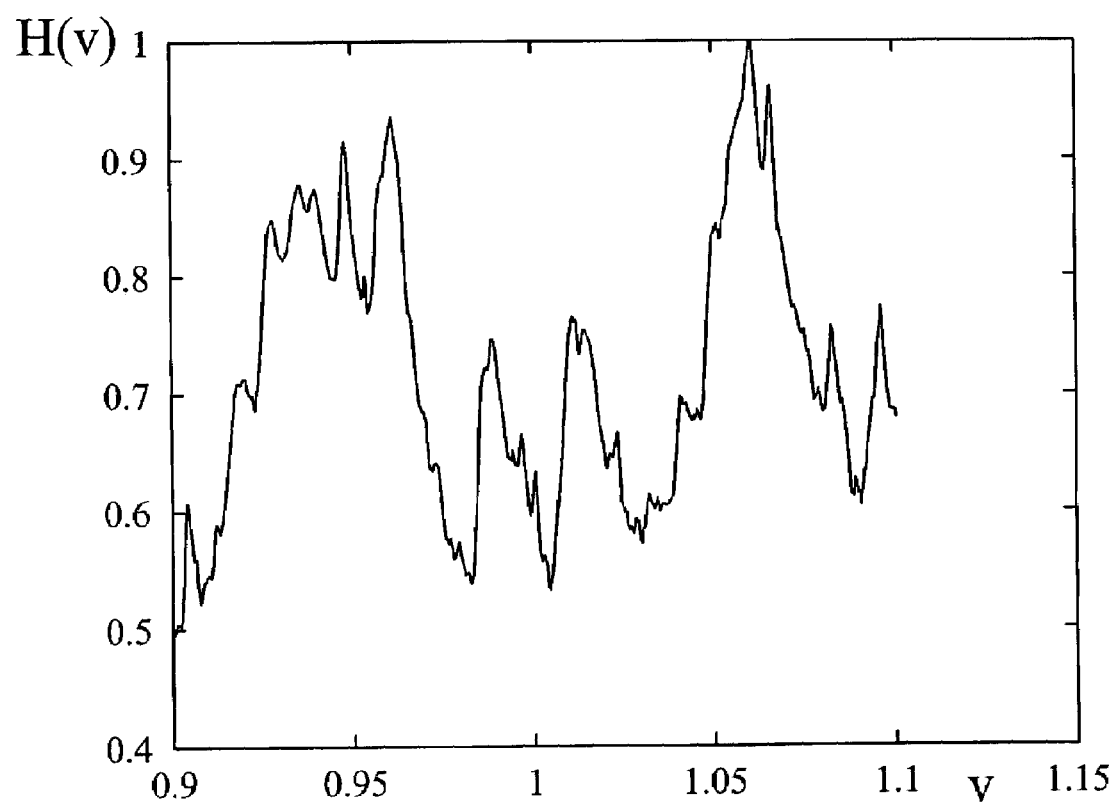
FIG. 9 is a graph of a filter response for a single filter suitable for obtaining a multi-peak spectral measurement from a diffuse source according to an embodiment of the present invention.

If the transmission across FIG. 8 is summed at each wavelength, the spectral response of the filter for spatially broadband (incoherent) sources can be estimated. FIG. 9 illustrates the results of summing the transmission bands in FIG. 8 at each wavelength. In FIG. 9, the spectral response is highly structured.

Figure 10:
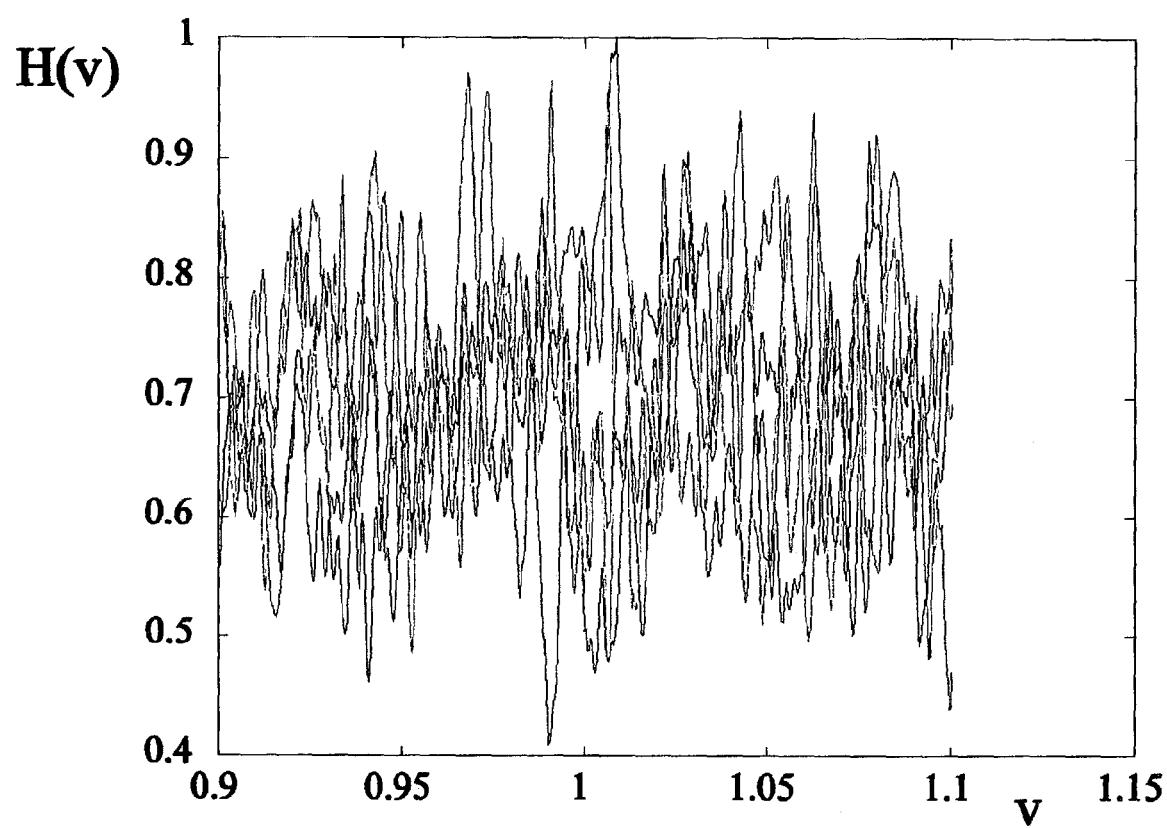
FIG. 10 is a graph of multiple uncorrelated filter responses suitable for obtaining different multi-peak spectral measurements from a plurality of points on a diffuse source according to embodiment of the present invention.

Creation of an MMS system using multichannel thin film filters includes realizing a large number of filters with responses as structured as the response shown in FIG. 9. FIG. 10 illustrates the spectral responses of 5 thin film filters realized with random layer thickness. In FIG. 10, the different spectral responses are highly uncorrelated.

Optimized design of the layer thicknesses in a set of spectrally varying filters is expected to substantially improve the orthogonality and inversion rank of multichannel thin film filters. As shown in FIG. 8, however, curvature in the spectral response is difficult to completely remove. Substantial flattening of this response is expected to require 3D modulated filters, such as volume holograms or photonic crystals.

Biological or Chemical Filter Design

Figure 11A:
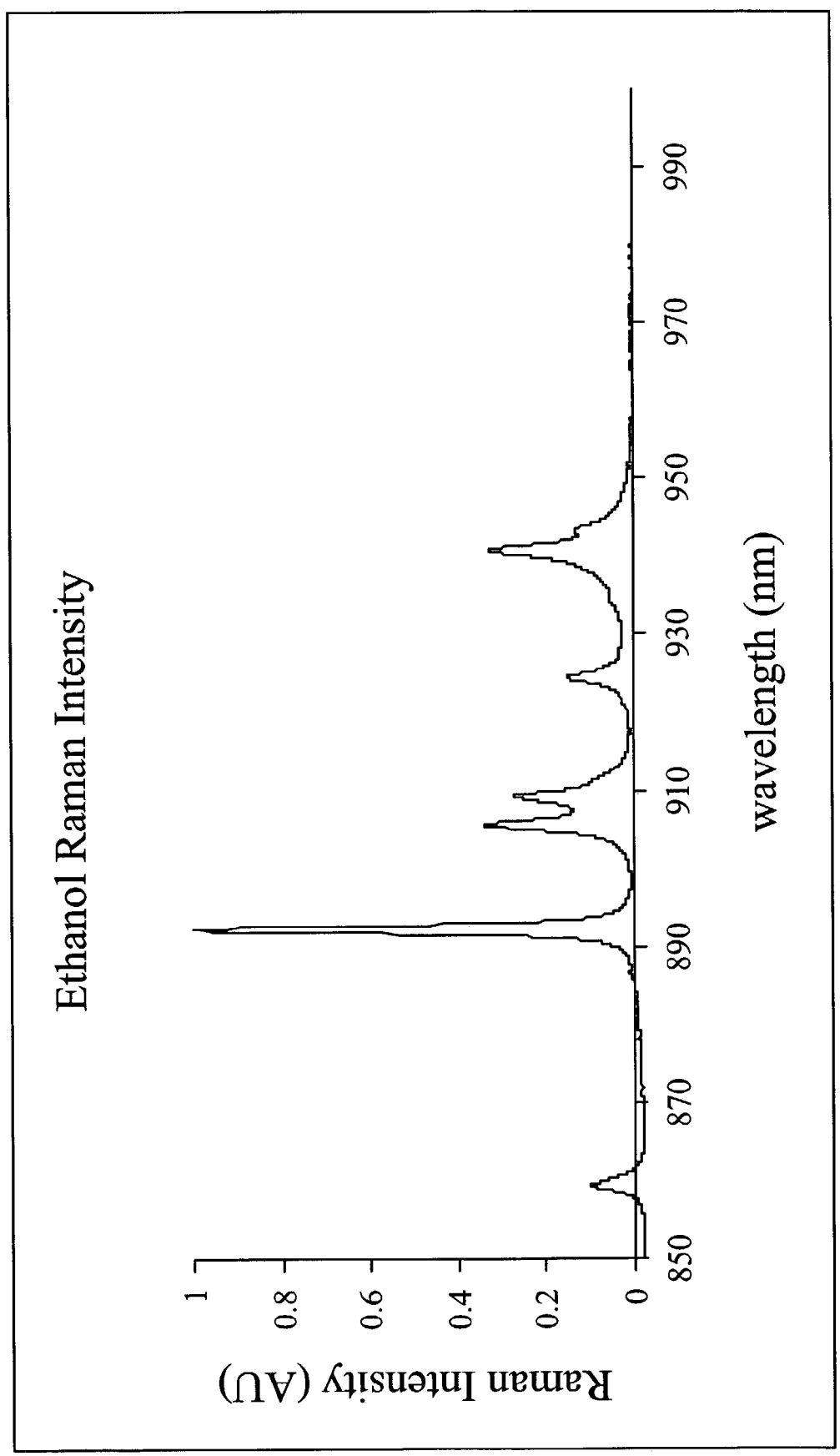
FIG. 11A is a graph of a Raman spectra for ethanol.

Molecules emit or absorb characteristic spectra in a variety of situations. Raman spectra, which are inelastic shifts of scattered radiation due to intermolecular vibrational resonances, are particularly characteristic of molecular sources. Ethanol, for example, has Raman lines at 436, 886, 1062, 1095, 1279 and 1455 inverse centimeters relative to the excitation source. FIG. 11A illustrates typical Raman spectra for ethanol in water.

Figure 11B:
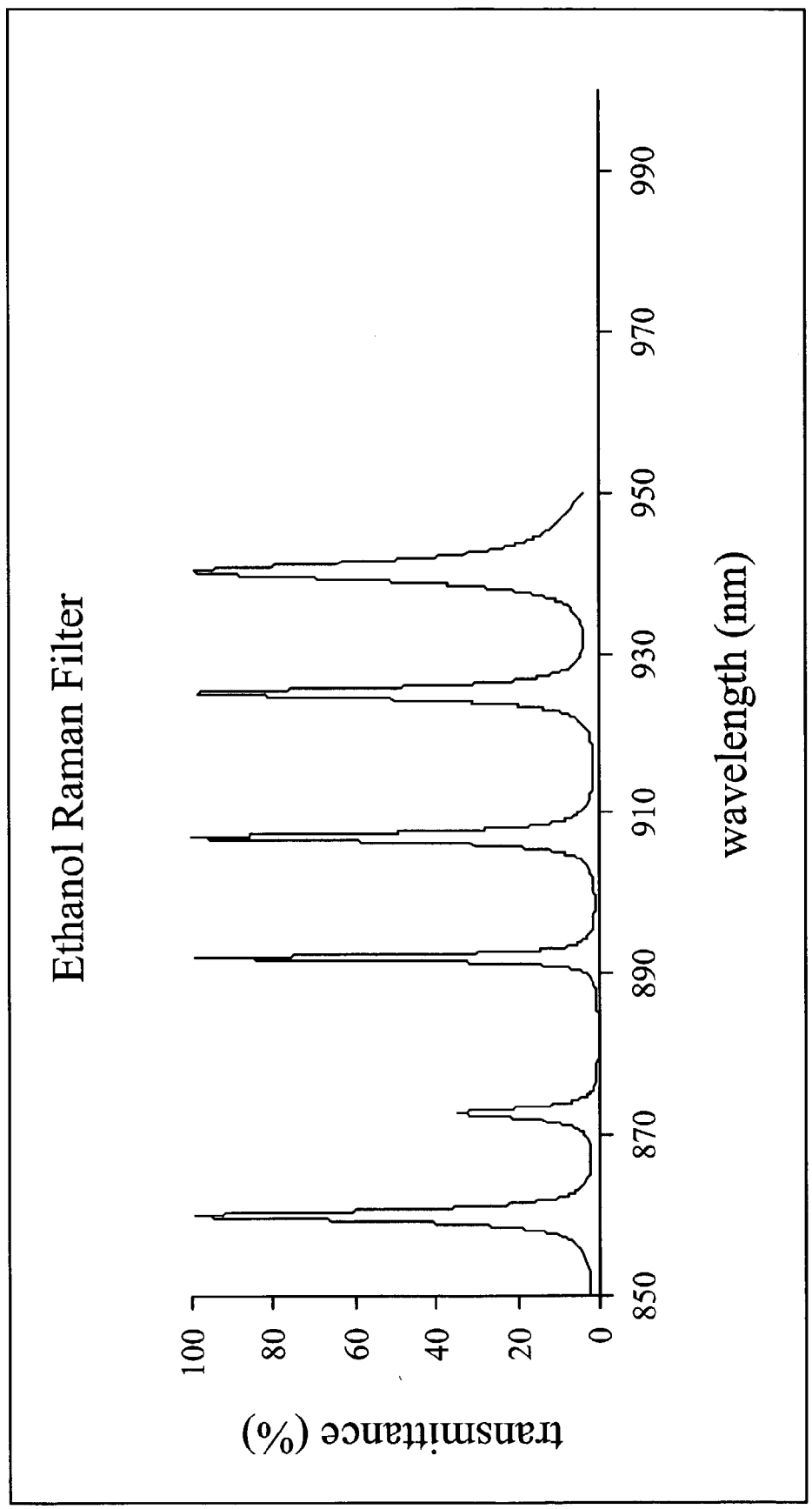
FIGS. 11B and 11C are graphs of transmittance functions for different thin film features for detecting concentration of ethanol in a diffuse source according to an embodiment of the present invention.

In diffuse multicomponent environments, many spectra signals will be present. Partial least squares algorithms weight spectral components or individual measurements so to enable estimation of target densities. In designing an MMS sensor, one balances physical reliability of a filter function against the design goals. A thin film filter, for example, can be designed to pass multiple wavelengths to selectively measure components of interest based on PLS optimization. For example, FIG. 11B shows the transmittance of a thin film filter designed for ethanol detection. A multiplex filter design for ethanol however, does not necessarily have to match just the peaks of the ethanol Raman spectra. The design may be derived from the PLS optimization or other suitable multivariate optimization technique.

Figure 11C:
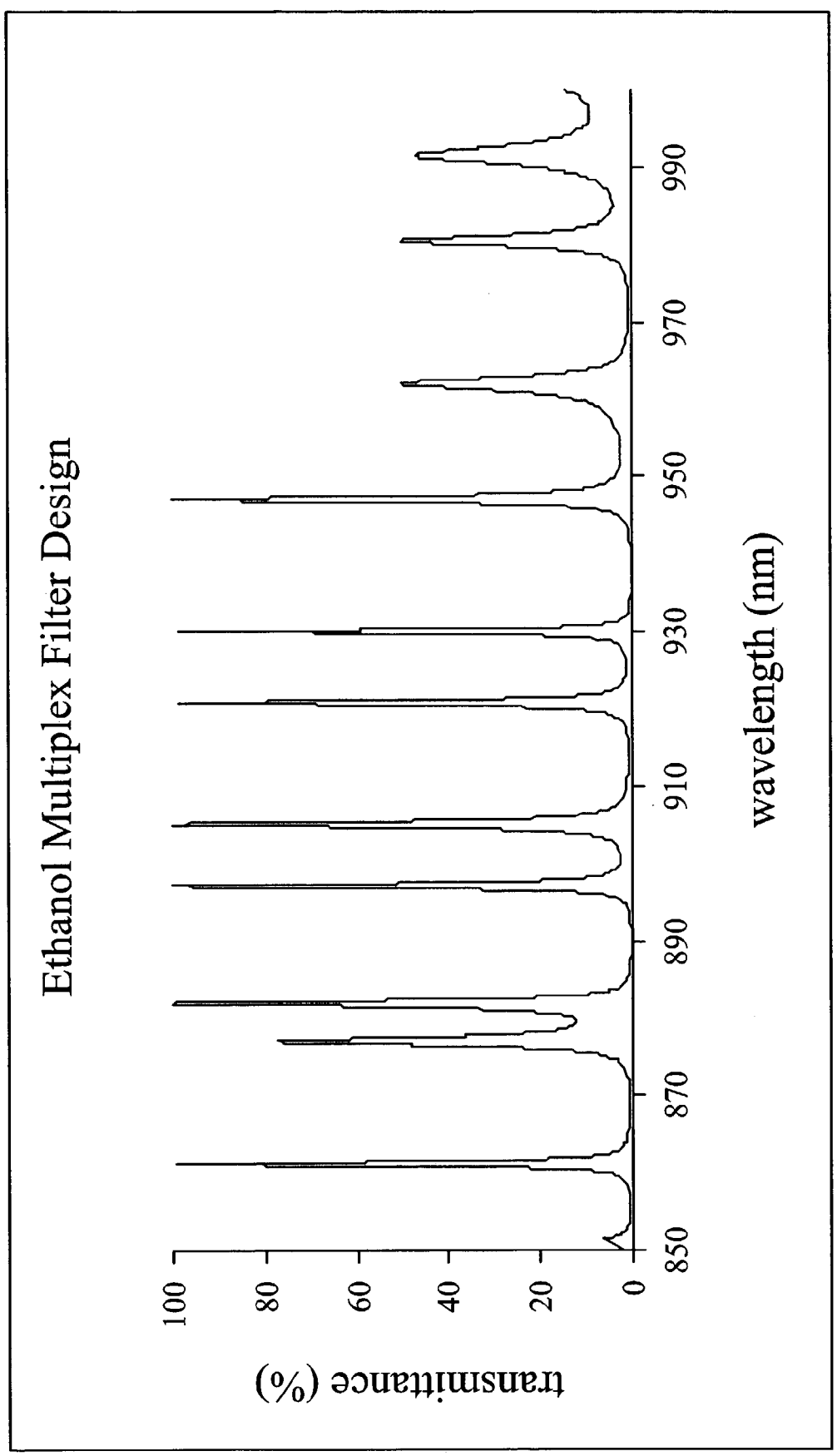

The filter illustrated in FIG. 11B would be one of 4–16 different components in a multichannel MMS detector system. An example of a different multi-peak filter function that may be used in a multichannel MMS detector for detecting ethanol is shown in FIG. 11C. This process may be repeated for each filter element to form an MMS detector with different multi-peak filter functions for ethanol detection according to an embodiment of the invention. Once the different filters are created, measurements from the different filters can be combined using the equations described above to estimate the chemical composition of a spectrally diffuse source. For example, measurements may be simultaneously taken using the different multi-peak filters. Each measurement may be multiplied by the inverse of its respective filter function to yield the concentration of the compound of interest measured by each detector element. The concentrations may be combined to estimate the average concentration in the source using the equations described above.

Variation in the filter response as a function of angle of incidence is a problem with thin film systems. Spatial filtering would be needed to restrict the angles of incidence to a range consistent with the desired spectral response.

3D Filters

In yet another embodiment of the invention, array 102 may be implemented using a 3D filter. A 3D filter is modulates the index of refraction along all three dimensions. The simplest form of 3D spectral filter is a volume hologram, typically recorded by a photorefractive effect. Volume holograms can be extraordinarily selective spectrally, especially if they are recorded along the direction of propagation. The disadvantage of volume holograms is that they are based on very weak index modulations and that these weak modulations fall rapidly as the complexity of the hologram is increased [40]. The advantage of volume holograms is that the spatial and spectral response of the system can be precisely programmed. As an MMS system, a volume hologram recorded as a set of "shift multiplexed" [41] reflection gratings could be set to operate as an arbitrary multichannel filter on each source point.

Figure 12:
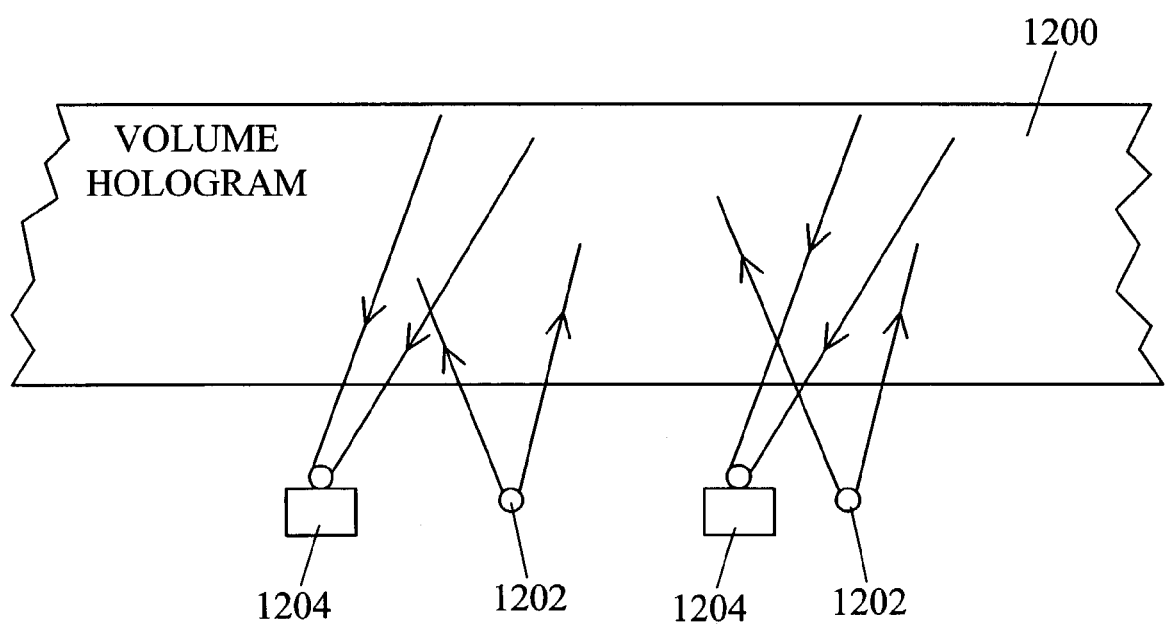
FIG. 12 is a schematic diagram of a 3-D volume hologram suitable for obtaining multi-peak spectral measurements from different points on a diffuse source according to an embodiment of the present invention.

FIG. 12 illustrates an example of a volume hologram suitable for use with the present invention. In FIG. 12, a hologram layer 1200 includes a plurality of reflective elements for reflecting light emanating from different source points 1202. The light emanating from the different source points are detected by detector elements 1204. By using strong holographic materials, such as photopolymers, and combining holographic confinement with layered media, this approach may be successful in creating a high etendue MMS system.

In yet another alternate embodiment of the invention the spectral selectivity and programmability of volume holography can be exchanged for the ease of fabrication and manufacturing associated with photonic crystals or photonic glasses (quasi-random structured materials). The idea of using photonic crystals as multiplex spectral filters is particularly promising in the context of recent results on "superprism" effects [42–50]. The superprism effect yields high spectral dispersion on propagation through photonic crystals. The effective dispersion may be 1–2 orders of magnitude in excess of corresponding values for conventional dielectrics. For MMS applications, very thin samples of microcavities or gratings may be used.

Photonic Crystal Structures

Figure 13:
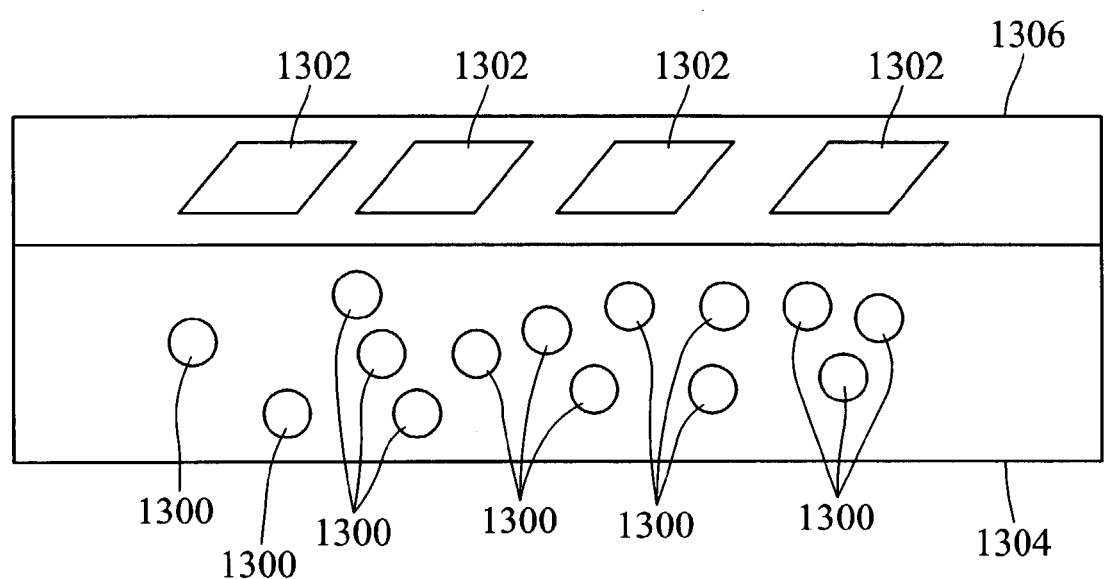
FIG. 13 is a schematic diagram of an array of dielectric microspheres and detectors suitable for obtaining multi-peak spectral measurements according to an embodiment of the present invention.
Figure 13A:
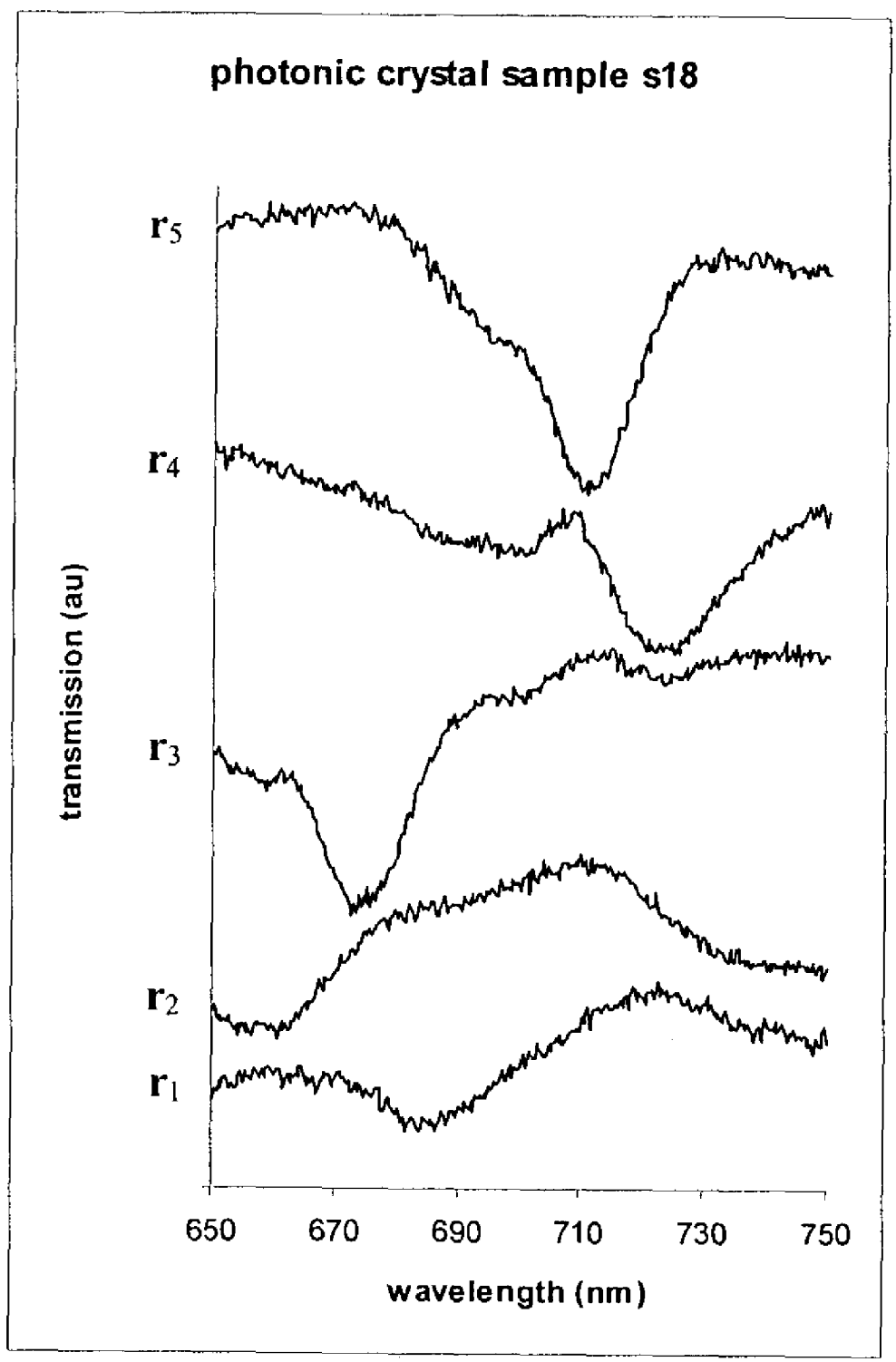
FIG. 13A is a graph illustrating exemplary multi-peak filter functions of a photonic crystal suitable for use with embodiments of the present invention.

FIG. 13 illustrates an example of a photonic crystal suitable for use with the present invention. In FIG. 13, a photonic crystal structure may include a plurality of dielectric spheres 1300 located in front of detector elements 1302. Dielectric spheres 1300 may be located in a thin film medium 1304 and detectors 1302 may be located in another medium 1306. In one exemplary embodiment, dielectric spheres 1300 may be made of glass. Light incident from a diffuse source is scattered by dielectric, spheres 1300, captured by detectors 1302 and processed in order to determine properties of the source. The spatio-spectral mapping from the source to the detectors creates a quasi-random mapping for MMS analysis. FIG. 13A shows such a mapping for an inhomogeneous photonic crystal fabricated at Clemson University and tested by the inventors of the present invention at Duke University [51–55]. The goal of fabricating such a photonic crystal has been to design a filter that uniformly passes a single wavelength [51–55]. However, due to spatial non-uniformities, such a crystal can be used to determine spectral properties of a diffuse source by inverting the filter functions of different positions in the crystal and combining the measurements, as described above.

Each curve in FIG. 13A corresponds to a spectral measurement at a different position, $r_i$, behind a photonic crystal filter. The measurements were made by illuminating the sample with a spatially incoherent spectrally broadband source and then measuring the transmitted spectrum at points behind the photonic crystal using a fiber coupled spectrometer. The collection area for the fiber was 9 microns in diameter. The differences in the spectral response for each curve represent spectral diversity, as defined above. Over the spectral range from 650 to 750 nm, the spectral diversity of the different detection points is high. Detectors measuring the total optical power at each detection point over this range would measure $\vec{m} = \int \vec{h}(v)\overline{S}(v)dv$, where $\vec{h}(v)$ is a vector of functions. Each component function corresponds to one of the spectral response curves in FIG. 13A. As discussed above, this vector transformation may be inverted to estimate the mean spectrum or the chemical composition of a sample.

Figure 14A:
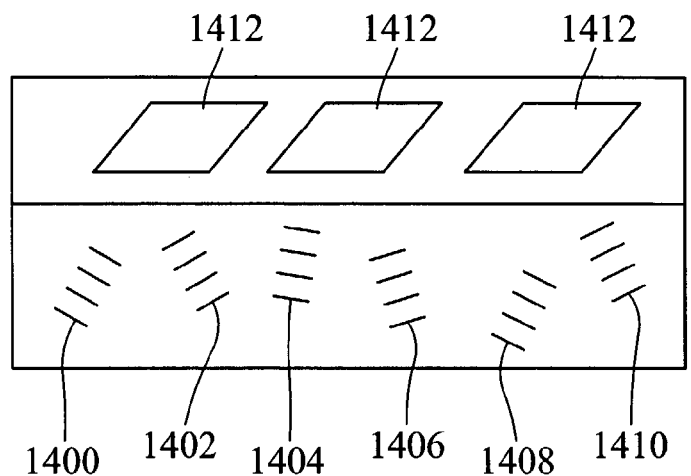
FIG. 14A is a schematic diagram of a multi-axis filter array suitable for obtaining multi-peak spectral measurements from different points on a diffuse source according to an embodiment of the present invention.

In yet another alternate embodiment, rather than using dielectric spheres, rectilinear structures can be used to compress the modal propagation range and create spatio-spectral structure on the sensor plane. FIG. 14A illustrates a rectilinear crystalline structure suitable for use with the present invention. Referring to FIG. 14A, a plurality of rectilinear structures 1400–1410 are located in front of detectors 1412. Rectilinear structures 1400–1410 may include strips of absorptive or reflective material. Rectilinear structures 1400–1410 are preferably different from each other to produce a different filter response for different points of a diffuse source.

Figure 14B:
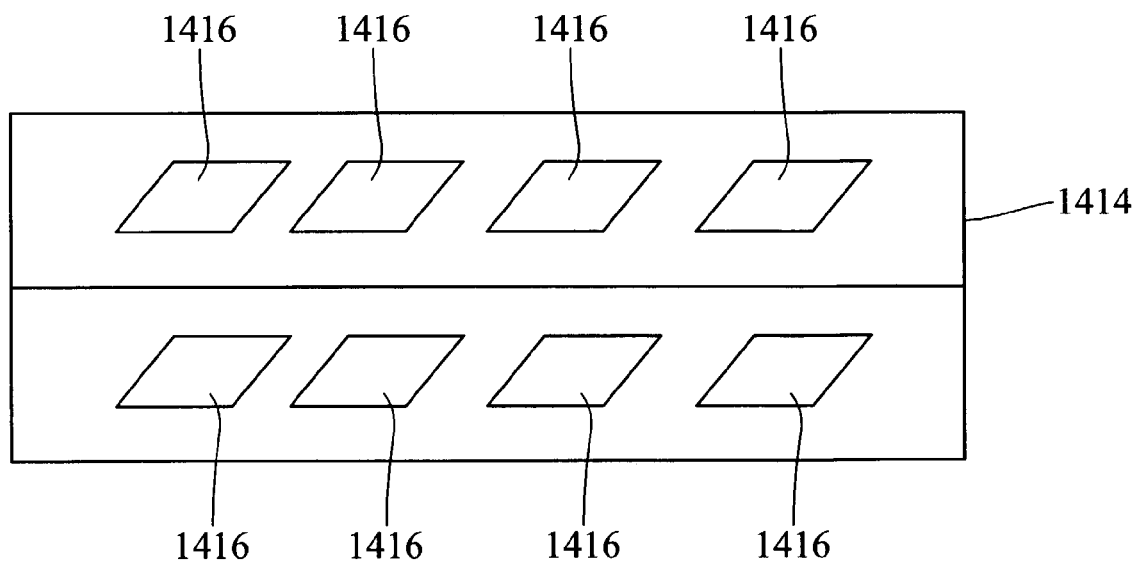
FIG. 14B is a schematic diagram of a stacked filter/detector array suitable for obtaining multi-peak spectral measurements according to an embodiment of the present invention.

FIG. 14B illustrates a stacked filter/detector array suitable for obtaining multi-peak spectral measurements according to an embodiment of the present invention. Detectors 1416 are embedded in the filter stack 1414 so that some source frequencies are absorbed at one detector layer while passing other frequencies to the subsequent detector layers.

Spectrally Sensitive Detectors

As noted above, multichannel filter operation can be used spectrally selective absorbers, rather than inteferometric filters. Ideally, these absorbers consist of a heterogeneous set of relatively narrow band species. For example, a detector formed from an array of quantum dots may be used, as in [5]. Rather than attempting to electrically isolate individual dot channels, however, one may integrate over a selection of spectral channels. If one made detectors containing numbers of dots proportional to or less than the number of spectral channels the dots absorbed, one would expect relatively random spectral responses in each detector. An array of such detectors might be used to reconstruct the mean spectrum.

The disclosure of each of the following references is hereby incorporated herein by reference in its entirety.

REFERENCES CITED

[1] L. Mandel and E. Wolf, *Optical coherence and quantum optics*. Cambridge: Cambridge University Press, 1995.

[2] K. J. Zuzak, M. D. Schaeberle, E. N. Lewis, and I. W. Levin, "Visible reflectance hyperspectral imaging: Characterization of a noninvasive, in vivo system for determining tissue perfusion," *Analytical Chemistry*, vol. 74, pp. 2021–2028, 2002.

[3] T. H. Pham, F. Bevilacqua, T. Spott, J. S. Dam, B. J. Tromberg, and S. Andersson-Engels, "Quantifying the absorption and reduced scattering coefficients of tissue-like turbid media over a broad spectral range with non-contact Fourier-transform hyperspectral imaging," *Applied Optics*, vol. 39, pp. 6487–6497, 2000.

[4] T. H. Pham, C. Eker, A. Durkin, B. J. Tromberg, and S. Andersson-Engels, "Quantifying the optical properties and chromophore concentrations of turbid media by chemometric analysis of hyperspectral diffuse reflectance data collected using a fourier interferometric imaging system," *Applied Spectroscopy*, vol. 55, pp. 1035–1045, 2001.

[5] J. L. Jimenez, L. R. C. Fonseca, D. J. Brady, J. P. Leburton, D. E. Wohlert, and K. Y. Cheng, "The quantum dot spectrometer," *Applied Physics Letters*, vol. 71, pp. 3558–3560, 1997.

[6] E. Wolf, "Coherent-mode propagation in spatially band-limited wave fields," *Journal of the Optical Society of America A*, vol. 3, pp. 1920–1924, 1986.

[7] M. C. Denham, "Implementing Partial Least-Squares," *Statistics and Computing*, vol. 5, pp. 191–202, 1995.

[8] D. M. Haaland and E. V. Thomas, "Partial Least-Squares Methods for Spectral Analyses .1. Relation to Other Quantitative Calibration Methods and the Extraction of Qualitative Information," *Analytical Chemistry*, vol. 60, pp. 1193–1202, 1988.

[9] A. Phatak and F. de Hoog, "Exploiting the connection between PLS, Lanczos methods and conjugate gradients: alternative proofs of some properties of PLS," *Journal of Chernometrics*, vol. 16, pp. 361–367, 2002.

[10] J. A. Westerhuis, T. Kourti, and J. F. MacGregor, "Analysis of multiblock and hierarchical PCA and PLS models," *Journal of Chemometrics*, vol. 12, pp. 301–321, 1998.

[11] S. Wold, J. Trygg, A. Berglund, and H. Antti, "Some recent developments in PLS modeling," *Chemometrics and Intelligent Laboratory Systems*, vol. 58, pp. 131–150, 2001.

[12] J. F. James and R. S. Sternberg, *The Design of Optical Spectrometers*. London: Chapman & Hall, 1969.

[13] J. Courtial, B. A. Patterson, A. R. Harvey, W. Sibbett, and M. J. Padgett, "Design of a static Fourier-transform spectrometer with increased field of view," *Applied Optics*, vol. 35, pp. 6698–6702, 1996.

[14] J. Courtial, B. A. Patterson, W. Hirst, A. R. Harvey, A. J. Duncan, W. Sibbett, and M. J. Padgett, "Static Fourier-transform ultraviolet spectrometer for gas detection," *Applied Optics*, vol. 36, pp. 2813–2817, 1997.

[15] E. V. Ivanov, "Static Fourier transform spectroscopy with enhanced resolving power," *Journal of Optics a-Pure and Applied Optics*, vol. 2, pp. 519–528, 2000.

[16] C. C. Montarou and T. K. Gaylord, "Analysis and design of compact, static Fourier-transform spectrometers," *Applied Optics*, vol. 39, pp. 5762–5767, 2000.

[17] M. J. Padgett and A. R. Harvey, "A Static Fourier-Transform Spectrometer Based on Wollaston Prisms," *Review of Scientific Instruments*, vol. 66, pp. 2807–2811, 1995.

[18] B. A. Patterson, M. Antoni, J. Courtial, A. J. Duncan, W. Sibbett, and M. J. Padgett, "An ultra-compact static Fourier-transform spectrometer based on a single birefringent component," *Optics Communications*, vol. 130, pp. 1–6, 1996.

[19] B. A. Patterson, J. P. Lenney, W. Sibbett, B. Hirst, N. K. Hedges, and M. J. Padgett, "Detection of benzene and other gases with an open-path, static Fourier-transform UV spectrometer," *Applied Optics*, vol. 37, pp. 3172–3175, 1998.

[20] D. Steers, B. A. Patterson, W. Sibbett, and M. J. Padgett, "Wide field of view, ultracompact static Fourier-transform spectrometer," *Review of Scientific Instruments*, vol. 68, pp. 30–33, 1997.

[21] S. Strassnig and E. P. Lankmayr, "Elimination of matrix effects for static headspace analysis of ethanol," *Journal of Chromatography A*, vol. 849, pp. 629–636, 1999.

[22] G. Zhan, "Static Fourier-transform spectrometer with spherical reflectors," *Applied Optics*, vol. 41, pp. 560–563, 2002.

[23] J. F. James, R. S. Sternberg, and a. joint, *The design of optical spectrometers*. London: Chapman & Hall, 1969.

[24] I. Abdulhalim, "Omnidirectional reflection from anisotropic periodic dielectric stack," *Optics Communications*, vol. 174, pp. 43–50, 2000.

[25] D. Bria, B. Djafari-Rouhani, E. H. El Boudouti, A. Mir, A. Akjouj, and A. Nougaoui, "Omnidirectional optical mirror in a cladded-superlattice structure," *Journal of Applied Physics*, vol. 91, pp. 2569–2572, 2002.

[26] K. M. Chen, A. W. Sparks, H. C. Luan, D. R. Lim, K. Wada, and L. C. Kimerling, "SiO2/TiO2 omnidirectional reflector and microcavity resonator via the sol-gel method," *Applied Physics Letters*, vol. 75, pp. 3805–3807, 1999.

[27] E. Cojocaru, "Omnidirectional reflection from Solc-type anisotropic periodic dielectric structures," *Applied Optics*, vol. 39, pp. 6441–6447, 2000.

[28] E. Cojocaru, "Omnidirectional reflection from finite periodic and Fibonacci quasi-periodic multilayers of alternating isotropic and birefringent thin films," *Applied Optics*, vol. 41, pp. 747–755, 2002.

[29] M. Deopura, C. K. Ullal, B. Temelkuran, and Y. Fink, "Dielectric omnidirectional visible reflector," *Optics Letters*, vol. 26, pp. 1197–1199, 2001.

[30] Y. Fink, J. N. Winn, S. H. Fan, C. P. Chen, J. Michel, J. D. Joannopoulos, and E. L. Thomas, "A dielectric omnidirectional reflector," *Science*, vol. 282, pp. 1679–1682, 1998.

[31] B. Gallas, S. Fisson, E. Charron, A. Brunet-Bruneau, G. Vuye, and J. Rivory, "Making an omnidirectional reflector," *Applied Optics*, vol. 40, pp. 5056–5063, 2001.

[32] C. Hooijer, D. Lenstra, and A. Lagendijk, "Mode density inside an omnidirectional mirror is heavily directional but not small," *Optics Letters*, vol. 25, pp. 1666–1668, 2000.

[33] S. H. Kim and C. K. Hwangbo, "Design of omnidirectional high reflectors with quarter-wave dielectric stacks for optical telecommunication bands," *Applied Optics*, vol. 41, pp. 3187–3192, 2002.

[34] J. Lekner, "Omnidirectional reflection by multilayer dielectric mirrors," *Journal of Optics a-Pure and Applied Optics*, vol. 2, pp. 349–352, 2000.

[35] Z. Y. Li and Y. N. Xia, "Omnidirectional absolute band gaps in two-dimensional photonic crystals," *Physical Review B*, vol. 6415, pp. art. no.-153108, 2001.

[36] D. Lusk, I. Abdulhalim, and F. Placido, "Omnidirectional reflection from Fibonacci quasi-periodic one-dimensional photonic crystal," *Optics Communications*, vol. 198, pp. 273–279, 2001.

[37] W. H. Southwell, "Omnidirectional mirror design with quarter-wave dielectric stacks," *Applied Optics*, vol. 38, pp. 5464–5467, 1999.

[38] B. Temelkuran, E. L. Thomas, J. D. Joannopoulos, and Y. Fink, "Low-loss infrared dielectric material system for broadband dual-range omnidirectional reflectivity," *Optics Letters*, vol. 26, pp. 1370–1372, 2001.

[39] X. Wang, X. H. Hu, Y. Z. Li, W. L. Jia, C. Xu, X. H. Liu, and J. Zi, "Enlargement of omnidirectional total reflection frequency range in one-dimensional photonic crystals by using photonic heterostructures," *Applied Physics Letters*, vol. 80, pp. 4291–4293, 2002.

[40] D. Brady and D. Psaltis, "Control of Volume Holograms," *Journal of the Optical Society of America a-Optics Image Science and Vision*, vol. 9, pp. 1167–1182, 1992.

[41] G. Barbastathis, M. Levene, and D. Psaltis, "Shift multiplexing with spherical reference waves," *Applied Optics*, vol. 35, pp. 2403–2417, 1996.

[42] T. Baba and M. Nakamura, "Photonic crystal light deflection devices using the superprism effect," *Ieee Journal of Quantum Electronics*, vol. 38, pp. 909–914, 2002.

[43] T. Ochiai and J. Sanchez-Dehesa, "Superprism effect in opal-based photonic crystals," *Physical Review B*, vol. 6424, pp. art. no.-245113, 2001.

[44] M. Koshiba, "Wavelength division multiplexing and demultiplexing with photonic crystal waveguide couplers," *Journal of Lightwave Technology*, vol. 19, pp. 1970–1975, 2001.

[45] A. Shinya, M. Haraguchi, and M. Fukui, "Interaction of light with ordered dielectric spheres: Finite- difference time-domain analysis," *Japanese Journal of Applied Physics Part 1-Regular Papers Short Notes & Review Papers*, vol. 40, pp. 2317–2326, 2001.

[46] A. Sharkawy, S. Y. Shi, and D. W. Prather, "Multichannel wavelength division multiplexing with photonic crystals," *Applied Optics*, vol. 40, pp. 2247–2252, 2001.

[47] H. M. van Driel and W. L. Vos, "Multiple Bragg wave coupling in photonic band-gap crystals," *Physical Review B*, vol. 62, pp. 9872–9875, 2000.

[48] H. B. Sun, Y. Xu, J. Y. Ye, S. Matsuo, H. Misawa, J. F. Song, G. T. Du, and S. Y. Liu, "Photonic gaps in reduced-order colloidal particulate assemblies," *Japanese Journal of Applied Physics Part 2-Letters*, vol. 39, pp. L591–L594, 2000.

[49] H. Kosaka, T. Kawashima, A. Tomita, M. Notomi, T. Tamamura, T. Sato, and S. Kawakami, "Superprism phenomena in photonic crystals: Toward microscale lightwave circuits," *Journal of Lightwave Technology*, vol. 17, pp. 2032–2038, 1999.

[50] H. Kosaka, T. Kawashima, A. Tomita, M. Notomi, T. Tamamura, T. Sato, and S. Kawakami, "Superprism phenomena in photonic crystals," *Physical Review B*, vol. 58, pp. R10096–R10099, 1998.

[51] Foulger, S. H., P. Jiang, et al. (2002). "Photonic bandgap composites based on crystalline colloidal arrays." *Abstracts of Papers of the American Chemical Society* 223: 044-POLY.

[52] Foulger, S. H., P. Jiang, et al. (2001). "Photonic bandgap composites." *Advanced Materials* 13(24): 1898-+.

[53] Perpall, M. W., K. P. U. Perera, et al. (2002). "High yield precursor polymer for inverse carbon opal photonic materials." *Abstracts of Papers of the American Chemical Society* 223: 222-POLY.

[54] Smith, D. W., S. G. Chen, et al. (2002). "Perfluorocyclobutyl copolymers for microphotonics: Thermo-optics, electro-optics, rare earth doping, and micromolding." *Abstracts of Papers of the American Chemical Society* 224: 063-POLY.

[55] Smith, D. W., S. R. Chen, et al. (2002). "Perfluorocyclobutyl copolymers for microphotonics." *Advanced Materials* 14(21): 1585-+.

Appendix

| | |
|---|---|
| r | radial coordinate in space |
| A | area |
| $\nu$ | frequency |
| k | wave vector |
| $\lambda$ | wavelength |
| c | speed of light |
| t | time |
| $\tau$ | time delay |
| m(r) | measurement at a single point r |
| I($\nu$, r) | spectral intensity distribution |
| h($\nu$, r) | filter function |
| $\bar{S}(\nu)$ | mean power spectrum |
| $\tilde{s}$ | target spectrum vector |
| $\tilde{s}_e$ | target spectrum vector estimate |
| $\tilde{m}$ | measurement state vector |
| H | transformation matrix |
| W | cross spectral density function |
| $\Gamma$ | mutual coherence function |
| $\psi$ | mode distribution |
| $\phi$ | orthonormal mode distribution |
| $\delta$ | delta function |
| $c_i$ | molecular concentration of the $i^{th}$ sample |
| $R_{\theta\phi}$ | rotation operator |

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for static multimode spectroscopy, the method comprising:

(a) simultaneously receiving spectral energy emanating from a plurality of different spatial points of a diffuse source;

(b) applying different multi-peak filter functions to the spectral energy emanating from the different points using an optical component to produce a multi-channel spectral measurement for each point, wherein the multi-channel spectral measurement is converted to an electrical signal by an element of a detector array and wherein the optical component is located between the diffuse source and the detector array; and (c) combining the multi-channel spectral measurements for the different points to estimate a property of the diffuse source, wherein combining the multi-channel spectral measurements to estimate a property of the source includes combining the multi-channel spectral measurements to estimate an average spectrum of the source and wherein combining the multi-channel spectral measurements to estimate an average spectrum of the source includes inverting the filter functions and integrating over an area of the source.

2. The method of claim 1 wherein simultaneously receiving spectral energy emanating from the plurality of different spatial points of the diffuse source includes receiving spectral energy emanating from a plurality of different spatial points of a biological sample.

3. The method of claim 2 wherein simultaneously receiving spectral energy emanating from the plurality of different points of the biological sample includes receiving spectral energy emanating from a plurality of different points of a tissue sample.

4. The method of claim 1 wherein simultaneously receiving spectral energy emanating from the plurality of different points of the diffuse source includes simultaneously receiving spectral energy emanating from a plurality of different points of a diffuse gas.

5. The method of claim 1 wherein applying different multi-peak filter functions to the spectral energy emanating from the different points using the optical component comprises passing the spectral energy from each point through a two-beam interferometer having a different interference path length for the spectral energy emanating from each point.

6. The method of claim 1 wherein applying different multi-peak filter functions to the spectral energy emanating from the different points using the optical component to produce a multi-channel spectral measurement for each point comprises passing the spectral energy from each point through a filter, wherein each filter has a different multi-peak response function.

7. The method of claim 6 wherein passing the spectral energy emanating from each point through the filter includes passing spectral energy emanating from each point through a thin film filter.

8. The method of claim 6 wherein passing the spectral energy emanating from each point through the filter includes passing spectral energy emanating from each point through a volume hologram.

9. The method of claim 6 wherein passing the spectral energy emanating from each point through the filter includes passing spectral energy emanating from each point through an array of photonic crystals.

10. The method of claim 1 wherein combining the multi-channel measurements to estimate a property of the source includes combining the multi-channel measurements to estimate density of chemical compounds in the source.

11. A method for static multimode spectroscopy, the method comprising:
(a) simultaneously receiving spectral energy emanating from a plurality of different spatial points of a diffuse source;
(b) applying different multi-peak filter functions to the spectral energy emanating from the different points to produce a multi-channel measurement for each point by sampling the spectral energy emanating from the different points using a detector array comprising a plurality of quantum dots; and
(c) combining the multi-channel spectral measurements for the different points to estimate a property of the diffuse source, wherein combining the multi-channel spectral measurements to estimate a property of the source includes combining the multi-channel spectral measurements to estimate an average spectrum of the source and wherein combining the multi-channel spectral measurements to estimate an average spectrum of the source includes inverting the filter functions and integrating over an area of the source.

12. A method for estimating a spatially averaged spectral density of a diffuse source of optical radiation, comprising:
integrating spectral energy of different modes of the diffuse source against a diversity of multi-peak spectral multiplexing functions at a same instance in time using an array of spatially distributed optical components and an optical detector array, wherein the array of spatially distributed optical components is located between the diffuse source and the optical detector array and wherein the optical detector produces an array of measurements; and
mathematically inverting the array of measurements to estimate the spatially averaged spectral density using a computer.

13. The method of claim 12, wherein mathematically inverting the array of measurements to estimate the spatially averaged spectral density comprises multiplying the array of spectral energy measurements by an inverted array of the multi-peak spectral multiplexing functions.

14. A method for estimating a target component density of chemical or biological spectral materials in a diffuse source of optical radiation, comprising:
integrating spectral energy of different modes of the diffuse source against a diversity of multi-peak spectral multiplexing functions at a same instance in time using an array of spatially distributed optical components and an optical detector array, wherein the array of spatially distributed optical components is located between the diffuse source and the optical detector array and wherein the optical detector produces an array of measurements; and
computationally analyzing the array of measurements to estimate the target component density using a computer, wherein computationally analyzing the array of measurements to estimate the target component density comprises linearly inverting a transformation between the target component density and the array of measurements.

15. A method for static multimode spectroscopy, the method comprising:
(a) simultaneously receiving spectral energy emanating from a plurality of different spatial points of a diffuse source;
(b) applying different multi-peak filter functions to the spectral energy emanating from the different points using an optical component to produce a multi-channel spectral measurement for each point, wherein the multi-channel spectral measurement is converted to an electrical signal by an element of a detector array and wherein the optical component is located between the diffuse source and the detector array; and
(c) combining the multi-channel spectral measurements for the different points to estimate a property of the diffuse source, wherein combining the multi-channel spectral measurements to estimate a property of the source includes combining the multi-channel spectral measurements to estimate an average spectrum of the source and wherein combining the multi-channel spectral measurements to estimate an average spectrum of the source includes combining the spectral measurements for the different modes using the cross spectral density.

16. A method for static multimode spectroscopy, the method comprising:
  (a) simultaneously receiving spectral energy emanating from a plurality of different spatial points of a diffuse source;
  (b) applying different multi-peak filter functions to the spectral energy emanating from the different points using an optical component to produce a multi-channel spectral measurement for each point, wherein the multi-channel spectral measurement is converted to an electrical signal by an element of a detector array and wherein the optical component is located between the diffuse source and the detector array; and
  (c) combining the multi-channel spectral measurements for the different points to estimate a property of the diffuse source, wherein applying different multi-peak filter functions to the spectral energy emanating from the different points using an optical component to produce a multi-channel spectral measurement for each point comprises passing the spectral energy from each point through an optical fiber and a fiber interferometer, wherein the fiber interferometer for each point has a different interferometric response.

17. A system for static multimode multiplex spectroscopy, the system comprising:
  (a) an illumination source for illuminating an object of interest;
  (b) an interferometer array for simultaneously receiving spectral energy emanating from a plurality of different points on the object of interest and for applying different multi-peak filter functions to the spectral energy emanating from the different points;
  (c) a detector array optically coupled to the interferometer array for receiving the filtered spectral energy and for converting the spectral energy into electrical signals; and
  (d) a multi-peak spectral measurements combination module for receiving the electrical signals from the detector array and for combining the electrical signals to estimate a property of the object, wherein the interferometer array comprises a plurality of fiber interferometers having different multi-peak interferometric responses.

* * * * *